(12) United States Patent
Flewitt et al.

(10) Patent No.: US 11,293,901 B2
(45) Date of Patent: Apr. 5, 2022

(54) METHOD FOR OPERATION OF RESONATOR

(71) Applicants: Cambridge Enterprise Limited, Cambridge (GB); Universidad Politécnica de Madrid, Madrid (ES)

(72) Inventors: Andrew Flewitt, Harston (GB); Girish Rughoobur, Cambridge, MA (US); Mario De Miguel-Ramos, Cambridge (GB); Enrique Iborra, Madrid (ES); Teona Mirea, Madrid (ES)

(73) Assignees: Cambridge Enterprise Limited, Cambridge (GB); Universidad Politecnica de Madrid, Madrid (ES)

( * ) Notice: Subject to any disclaimer, the term of this patent is extended or adjusted under 35 U.S.C. 154(b) by 0 days.

(21) Appl. No.: 16/607,561

(22) PCT Filed: May 9, 2018

(86) PCT No.: PCT/EP2018/062137
§ 371 (c)(1),
(2) Date: Oct. 23, 2019

(87) PCT Pub. No.: WO2018/206720
PCT Pub. Date: Nov. 15, 2018

(65) Prior Publication Data
US 2020/0132633 A1 Apr. 30, 2020

(30) Foreign Application Priority Data
May 9, 2017 (GB) ................................. 1707440

(51) Int. Cl.
*G01N 29/036* (2006.01)
*G01N 29/02* (2006.01)

(52) U.S. Cl.
CPC ......... *G01N 29/036* (2013.01); *G01N 29/022* (2013.01); *G01N 2291/0255* (2013.01);
(Continued)

(58) Field of Classification Search
CPC ... G01N 2291/0255; G01N 2291/0256; G01N 2291/0426; G01N 29/022; G01N 29/036
See application file for complete search history.

(56) References Cited

U.S. PATENT DOCUMENTS 5,873,154 A * 2/1999 Ylilammi ................ H03H 3/02
29/25.35
5,932,953 A * 8/1999 Drees .................... G01N 29/022
310/324

(Continued)

FOREIGN PATENT DOCUMENTS

| WO | WO 2005066635 | 7/2005 |
| WO | WO 2017075344 | 5/2017 |
| WO | WO 2017156127 | 9/2017 |

OTHER PUBLICATIONS

Iborra et al., 2013 "Acoustic Properties of Carbon Nanotube Electrodes in BAW Resonators", Joint European Frequency and Time Forum & International Frequency Control Symposium (EFTF/IFC), IEEE, pp. 984-987.

(Continued)

*Primary Examiner* — Francis C Gray
(74) *Attorney, Agent, or Firm* — Rudy J. Ng; Bozicevic, Field & Francis LLP

(57) ABSTRACT

Disclosed is a method of sensing a target analyte in a liquid sample using a bulk acoustic wave resonator device. The liquid sample is placed on the bulk acoustic wave resonator device which is operated to generate bulk acoustic waves. A shift in the fundamental resonant frequency of the bulk acoustic wave resonator device is measured. The bulk acoustic wave resonator device comprises a resonator structure
(Continued)

and an acoustic decoupling layer. The resonator structure comprises: a piezoelectric material layer; electrodes arranged to apply a driving signal to the piezoelectric material layer to generate bulk acoustic waves; and a resonator structure surface. The acoustic decoupling layer is formed over the resonator structure surface. The acoustic decoupling layer acoustic impedance is: up to ⅕ times or not less than 5 times the resonator structure acoustic impedance, and up to ⅕ times or not less than 5 times the liquid sample acoustic impedance.

13 Claims, 13 Drawing Sheets

(52) U.S. Cl.
CPC ........... *G01N 2291/0256* (2013.01); *G01N 2291/0426* (2013.01)

(56) References Cited

U.S. PATENT DOCUMENTS

| | | | | |
|---|---|---|---|---|
| 7,638,924 B2* | 12/2009 | Asada | ............... | G01N 29/07 310/317 |
| 7,914,740 B2* | 3/2011 | Zhang | ............ | G01N 29/2437 422/68.1 |
| 2007/0085447 A1* | 4/2007 | Larson, III | ........ | H03H 9/132 310/318 |
| 2008/0197430 A1* | 8/2008 | Aigner | ............. | B01L 3/5085 257/414 |
| 2010/0282005 A1* | 11/2010 | Kwon | ............ | H01L 41/1132 73/865 |
| 2012/0164753 A1 | 6/2012 | Johnston | | |
| 2017/0149408 A1* | 5/2017 | Belsick | ......... | H03H 9/02086 |

OTHER PUBLICATIONS

Aigner (2003) "Mems in RF Filter Applications Thin-film Bulk Acoustic Wave Technology," Infineon Technologies, 36 pages.
Barako et al.; (2014) "Reactive Metal Bonding of Carbon Nanotube Arrays for Thermal Interface Applications," IEEE Transactions on components, Packaging and Manufacturing Technology, vol. 4, No. 12, pp. 1906-1913.
Benes (1988) "Improved quartz crystal microbalance technique," Journal of Applied Physics vol. 56, No. 608, pp. 608-626.
Chen et al.; (2013) "Highly sensitive detection of organophosphorus pesticides by acetylcholinesterase-coated thin film bulk acoustics resonator mass-loading sensor," Biosensors and Bioelectronics, 41, 163-167.
Clement et al.; (2014) "On the effectiveness of lateral excitation of shear modes in AlN layered resonators," Ultrasonics, vol. 54, pp. 1504-1508.
DeMiguel-Ramos et al.; (2013) "Induced Surface Roughness to Promote the Growth of Tilted-AlN Films for Shear Mode Resonators," Joint UFFC, EFTF and PFM Symposium, pp. 274-277.
DeMiguel-Ramos et al.; (2015) "Assessment of the shear acoustic velocities in the different materials composing a high frequency solidly mounted resonator," Ultrasonics, vol. 62, pp. 195-199.
DeMiguel-Ramos et al.; (2015) "Optimized tilted c-axis AlN films for improved operation of shear mode resonators," Thin Solid Films, vol. 590, pp. 219-223.
DeMiguel-Ramos et al.; (2017) "Gravimetric biosensor based on a 1.3 GHz AlN shear-mode solidly mounted resonator," Sensors and Actuators B239, pp. 1282-1288.
Esconjauregui et al.; (2015) "Carbon nanotube forests as top electrode in electroacoustic resonators," Appl. Phys. Lett., vol. 107, p. 133106-133106-5.
Flewitt et al.;(2015) "ZnO based SAW and FBAR devices for bio-sensing applications," Journal of Non-Newtonian Fluid Mechanics, vol. 222, pp. 209-216.
Futaba et al. (2006) "Shape-engineerable and highly densely packed single-walled carbon nanotubes and their application as supercapacitor electrodes," Nature Materials, vol. 5, pp. 987-994.
Gabl et al.; (2004) "First results on label-free detection of DNA and protein molecules using a novel integrated sensor technology based on gravimetric detection principles," Biosensors & Bioelectronics, vol. 19, pp. 615-620, XP-002320316.
Garcia-Gancedo et al.; (2011) ZnO-Based FBAR Resonators with Carbon Nanotube Electrodes, IEEE Transactions on Ultrasonics, Ferroelectrics, and Frequency Control, vol. 58, No. 11, pp. 2438-2445.
Garcia-Gancedo et al.; (2011) "AlN-based BAW resonators with CNT electrodes for gravimetric biosensing," Sensors and Actuators B: Chemical, vol. 160, No. 1, pp. 1386-1393.
Garcia-Gancedo et al.; (2011) "Solidly Mounted Resonators with Carbon Nanotube Electrodes for Biosensing Applications," IEEE, 5 pages.
Garcia-Gancedo et al.; (2013) "Direct comparison of the gravimetric responsivities of ZnO-based FBARs and SMRs," Sensors and Actuators B: Chemical, vol. 183, pp. 136-143.
Hofmann et al.; (2009) "State of Transition Metal Catalysts During Carbon Nanotube Growth," J. Phys. Chem, vol. 113, pp. 1648-1656.
Joddar et al.; (2016) "Development of functionalized multi-walled carbon-nanotube-based alginate hydrogels for enabling biomimectic technologies," Nature, Scientific Reports, pp. 1-12.
Lakin and Wang (1981) "Acoustic bulk wave composite resonators," Appl. Phys. Lett, vol. 38, No. 3, 125-127.
Lu and Lewis (1972) "Investigation of film-thickness determination by oscillating quartz resonators with large mass oad," Journal pf Applied Physics, vol. 43, No. 11, pp. 4385-4390.
Mann et al. (2010) "Controlling the growth of carbon nanotubes for electronics devices," Microelectronic Engineering, vol. 87, pp. 1491-1493.
Mirea (2014) "Carbon Nanotube Forests as Top Electrode for AlN-Based Electroacoustic Resonators," IEEE, pp. 1476-1479.
Nirschl et al.; (2009) "Film bulk acoustics resonators for DNA and protein detection and investigation of in vitro bacterial S-layer formation," Sensors and Actuators A: Physical, vol. 156, pp. 180-184.
Olivares et al.; (2015) "Growth of carbon nanotube forests on metallic thin films," Carbon, ScienceDirect, pp. 9-16.
Pottigari and Kwon (2009) "Vacuum-Gapped Film Bulk Acoustic Resonator for Low-Loss Mass Sensing in Liquid," IEEE, pp. 156-159.
Qin et al.; (2011) "Viscosity sensor using ZnO and AlN thin film bulk acoustic resonators with tilted polar c-axis orientations," J. Appl. Phys. vol. 110, pp. 094511-11.
Robertson et al.; (2008) "Controlling the Catalyst During Carbon Nanotube Growth," Journal of Nanoscience and Nanotechnology, vol. 8, pp. 6105-6111.
Ruby (2007) "Review and Comparison of Bulk Acoustic Wave FBAR, SMR Technology," IEEE Ultrasonics Symposium, pp. 1029-1040.
Rughoobur et al.; (2016) "Room Temperature sputtering of inclined c-axis ZnO for Shear mode solidly mounted Yesonators," Appl. Phys. Lett, 108, pp. 034103-034103-5.
Sauerbrey (1959) "Verwendung von Schwingquarzen Zur Wagung Dunner Schichten und zur Mikrowagung," Zeitschrift Fur Physik, vol. 155, pp. 206-222.
Sugime et al.; (2014) "Growth Kinetics and Growth Mechanism of Ultrahigh Mass Density Carbon Nanotube Forests an Conductive Ti/Cu Supports," ACS appl. Mater. Interfaces, vol. 6, pp. 15440-15447.
Treacy et al.; (1996) "Exceptionally high Young's modulus observed for individual carbon nanotubes," Nature, vol. 381, pp. 678-680.
Wang et al.; (2003) "Peptides with selective affinity for carbon nanotubes," Articles, Nature Materials, vol. 2, pp. 196-200.
Weber et al. (2006) "Shear mode FBARs as highly sensitive liquid biosensors," Sensors and Actuators A, vol. 128, pp. 84-88.
Wingqvist et al.; (2007) "Shear mode AlN thin film electro-acoustic resonant sensor operation in viscous media," Sensors and Actuators B, vol. 123, pp. 466-473.

(56) References Cited

OTHER PUBLICATIONS

Wingqvist et al.; (2010) "AIN-based sputter-deposited shear mode thin film bulk acoustic resonator (FBAR) for Biosensors application- A review," Surface & Coatings Technology, vol. 205, pp. 1279-1286.

Xu et al.; (2009) "In-Liquid Quality Factor Improvement for Film Bulk Acoustic Resonators by Integration of Microfluidic Channels," IEEE Electron Device Letter, vol. 30, No. 6, pp. 647-649.

Xu et al.; (2011) "A high-Quality-Factor Film Bulk Acoustic Resonator in Liquid for Biosensing Applications," Journal of Microelectromechanical Systems, vol. 20, No. 1, pp. 213-220.

Yanagitani (2015) "Characteristics of Pure-SHEAR Mode BAW Resinators Consisting of (1120) Textured Zno Films," ResearchGate, Acoustics 08 Paris, 4987-4992.

Yokoyama et al.; (2012) "Analysis on electromechanical coupling coefficients in A1N-based bulk acoustic wave Yesonators based on first-principle calculations," IEEE International Ultrasonics Symposium Proceedings, pp. 551-554.

Zhang & Kim (2005) "Micromachined Acoustic Resonant Mass Sensors," Journal of Microelectromechanical Systems, IEEE, vol. 14, No. 4, pp. 699-706.

Zhong et al.; (2012) "Growth of Ultrahigh Density Single-Walled Carbon Nanotube Forests by Improved Catalyst Design," ACSNANO, vol. 6, No. 4, pp. 2893-2903.

GB 1707440.2 Search Report, dated Oct. 24, 2017, pp. 1-5.

\* cited by examiner

1. Si 100 n-type

2. Grow SiO$_2$ thermal
Sputter Mo, SiO$_2$, Mo and SiO$_2$ + CMP

3. Deposit Ir electrodes
and pattern using Mo hardmask

6. Pattern and deposit Al/Fe catalyst

4. Deposit AlN seed, then piezoelectric AlN layer

7. CVD growth of CNTs

5. Deposit Mo top electrode, pattern then etch

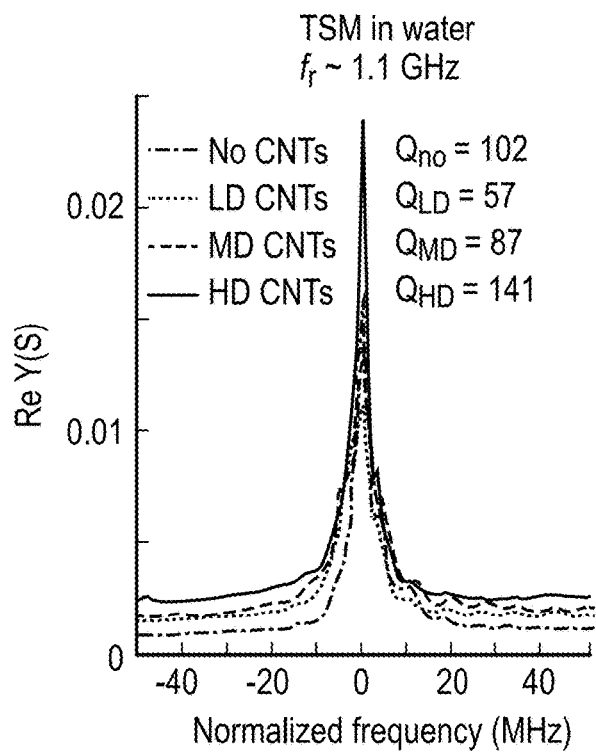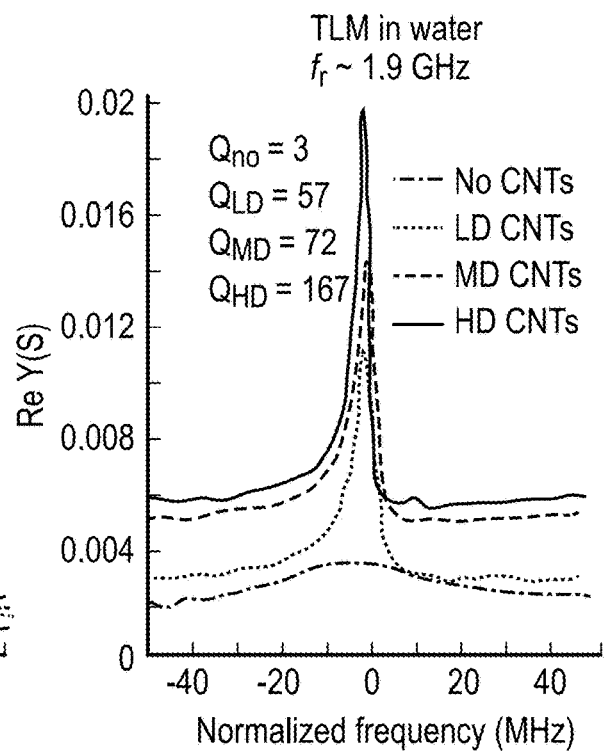
FIG. 9a             FIG. 9b
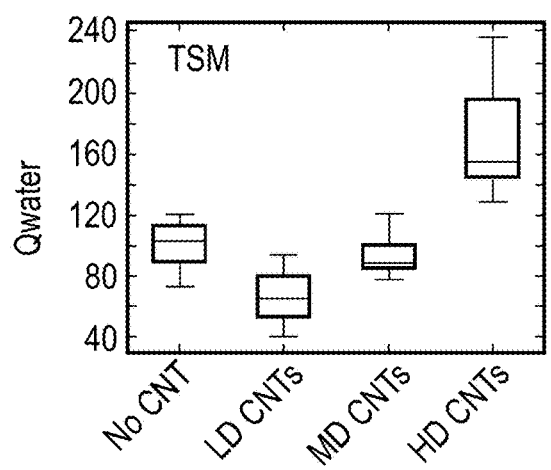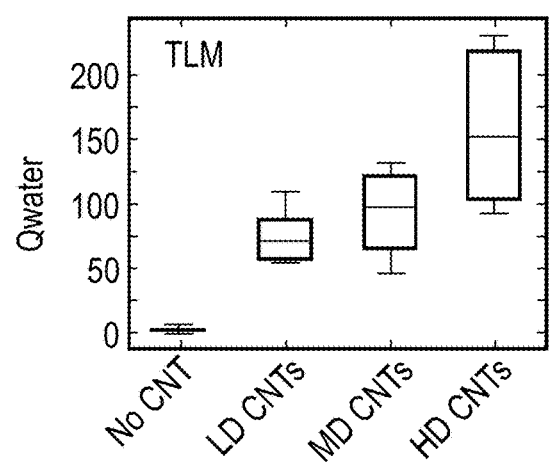
FIG. 9c             FIG. 9d

METHOD FOR OPERATION OF RESONATOR

The project leading to this application has received funding from the European Union's Horizon 2020 Research and Innovation programme under grant agreement No 636820.

BACKGROUND TO THE INVENTION

Field of the Invention

The present invention relates to a method of operation of a resonator. The invention has particular, but not exclusive, applicability to a bulk acoustic wave resonator (BAWR), such as a thin film bulk acoustic wave resonator (FBAR) or a solidly mounted resonator (SMR). Such resonators are of use in sensor applications, such as in gravimetric-based sensing.

Related Art

Acoustic resonators can be used for sensing of various chemical and biological agents in air. Such resonators are typically small and highly sensitive to mass changes, and have a relatively low manufacturing cost. For a typical acoustic mass sensor, the resonant frequency of the acoustic-wave resonator changes in response to the mass change on the resonator surface. Typically, such sensors are not suitable for sensing applications in liquid, because the thickness longitudinal mode (TLM) experiences a substantial reduction in Q factor. This reduction is typically large, usually more than 90%. The reduction of the Q factor is considered to be due to damping caused by loss of acoustic energy into the liquid.

Zhang and Kim (2005) disclose using an FBAR sensor in longitudinal mode. The sensor has a Q factor of 200-300 at about 1 GHz in air, allowing a vapour mass change of $10^{-9}$ g/cm$^2$ at its surface. In air, the sensor is operated in fundamental resonance mode. However, when the sensor is operated in liquid, the Q factor is reduced by several orders of magnitude, due to damping. Zhang and Kim (2005) propose instead to operate the sensor in liquid at its second harmonic resonance, at about 2 GHz, and report a Q factor of about 40. Therefore operating at the second harmonic resonance reduces the effects of damping by the liquid, but there is still more than 88% reduction in Q factor. Pottigari and Kwon (2009) form an FBAR device using a piezoelectric ZnO film sandwiched between Al electrodes as a transducer. A layer of parylene is supported over the uppermost electrode on supporting posts, with a vacuum gap between the parylene layer and the uppermost electrode. This approach was used in order to investigate the sensitivity of the FBAR device to sensing in liquid environments, with the parylene layer constituting a passive sensing diaphragm. In effect, the supporting posts guide the acoustic waves from the transducer into the passive sensing diaphragm. An effect is shown which is that the Q factor of the driving resonator is reduced by only 9% when sensing in water compared with air. The posts are essential to support the parylene layer and to withstand the pressure differential between the vacuum and the external atmosphere and they are the only way to transmit acoustic waves from the resonator to the sensible area. Additionally, the device structure proposed by Pottigari and Kwon (2009) is fragile and not robust enough for practical applications.

Xu et al (2011) discloses an FBAR sensor used in conjunction with microfluidic confinement in order to limit the available damping provided by the liquid. The thickness of the microfluidic channel is critical to this reduced damping and substantially limits the utility of the sensor to sample a suitable volume of liquid.

SUMMARY OF THE INVENTION

The present inventors have realised that it would be advantageous to provide a resonator device that is operable in liquid and which provides useful effects compared with prior art resonator devices, and propose a method of sensing a target analyte in a liquid sample using the device.

Accordingly, in a first preferred aspect, the present invention provides a method of sensing a target analyte in a liquid sample including the steps: (i) providing a bulk acoustic wave resonator device, (ii) placing a liquid sample on the bulk acoustic wave resonator device, (iii) operating the bulk acoustic wave resonator device to generate bulk acoustic waves, (iv) measuring a shift in a resonant frequency of the bulk acoustic wave resonator device.

The bulk acoustic wave resonator device comprises a resonator structure and an acoustic decoupling layer, the resonator structure comprising a piezoelectric material layer, electrodes arranged to apply a driving signal to the piezoelectric material layer to generate bulk acoustic waves, and a resonator structure surface. The resonator structure has a resonator structure acoustic impedance and the liquid sample has a liquid sample acoustic impedance. The acoustic decoupling layer is formed over the resonator structure surface. The acoustic decoupling layer has an acoustic decoupling layer acoustic impedance, the acoustic decoupling layer acoustic impedance being up to ⅕ times or not less than 5 times the resonator structure acoustic impedance, and up to ⅕ times or not less than 5 times the liquid sample acoustic impedance. In other words, the acoustic impedance of this layer is, by a factor of at least 5, smaller or larger than the respective acoustic impedances of the resonator structure and of the liquid sample.

Where the resonator structure includes a series of layers, the relevant resonator structure acoustic impedance may be taken as the acoustic impedance of the uppermost layer of the resonator structure.

By providing an acoustic decoupling layer with such an acoustic mismatch with respect to the acoustic impedance of the liquid sample, and of the resonator, the layer can act as an acoustic isolation layer. The acoustic impedance of the acoustic decoupling layer may be a factor of more than 10 times smaller or larger than the resonator structure acoustic impedance, and of the liquid sample acoustic impedance. However, the acoustic mismatch is preferably not so high as to prevent propagation of the wave through the acoustic decoupling layer for sensing. This is confirmed by the expression $R=(Z/Z_0-1)/(Z/Z_0+1)$, where R is the reflection coefficient. If $Z/Z_0$ is too large, the intensity of the wave passing through the interface is too low and can be vanished in the layer due to acoustic losses. A mismatch of 10 (i.e. 10 times larger or smaller) gives a transmission of 19% of the intensity, which is considered to be sufficient transmission to allow for useful sensing.

The acoustic impedance of the acoustic decoupling layer, resonator, and liquid sample may be measured in a manner well-known to the skilled person. Generally, to measure acoustic impedance, the sound velocity of the selected mode in the material is determined, and multiplied by mass density of the material. As the skilled person will be aware, the acoustic impedance of a material strongly depends on the propagation mode. In the present invention, therefore the acoustic impedance of the different elements is assessed with respect to the propagation mode used for the bulk acoustic wave resonator device. The acoustic impedance of a material typically does not vary with frequency in the range of operation of devices discussed herein. The bulk acoustic wave resonator device proposed herein may be an SMR type device. Alternatively, the device may be an FBAR type device. The fundamental resonant frequency of the bulk acoustic wave resonator device may be in the range 1-5 GHz.

The following references set out suitable methods for determining the acoustic impedance as used in this disclosure: DeMiguel-Ramos et al (2015); Iborra et al (2013).

Further optional features of the invention are set out below. These may be applied singly or in any suitable combination.

Preferably, the thickness of the acoustic decoupling layer is between 1/8λ and 50λ. λ is the wavelength in the decoupling layer at a fundamental resonant frequency of the resonator. More preferably, the upper limit of the thickness range of the acoustic decoupling layer may be selected to be e.g. 20λ, 10λ, or 2λ. The lower limit of the thickness range may be e.g. 1/8λ, 1/4λ or 1/2λ. Preferably, the thickness of the acoustic decoupling layer is a multiple of 1/2λ.

The acoustic decoupling layer may be formed from a number of materials, given that they fulfil the acoustic impedance requirements discussed above. Preferably, the acoustic decoupling layer comprises carbon nanotubes. Other examples of possible materials suitable for use as an acoustic decoupling layer may include, but are not limited to, polydimethylsiloxane (PDMS), parylene, and SU-8. Typical acoustic impedance values for different materials are set out further below.

As the skilled person will readily understand, the density of the acoustic impedance layer will have an effect on the sound velocity of the selected mode in the layer. With carbon nanotubes, the density of the layer will be affected by the number density of carbon nanotubes. Accordingly, where the acoustic impedance layer comprises carbon nanotubes, the density of carbon nanotubes in the layer may be at least $0.3 \times 10^{10}$ cm$^{-2}$, alternatively may be at least $0.5 \times 10^{10}$ cm$^{-2}$, at least $1 \times 10^{10}$ cm$^{-2}$, or at least $2 \times 10^{10}$ cm$^{-2}$.

The acoustic decoupling layer may include binding sites specific for the analyte in the liquid sample. For example, the acoustic decoupling layer may be functionalised to promote attachment of specific analytes.

The liquid sample may be an aqueous liquid, e.g. deionised (DI) water or a biological buffer. The mass density of typical biological buffers varies in the range 1 to 1.3 times of that of DI-water. Sound velocity between such liquids typically varies less than 3%. Therefore the acoustic impedance of a typical liquid sample is in the range of 1.48 MRayl (corresponding to pure water) to 2 MRayl for a highly concentrated buffer. These values are for typical buffers used in biological detection. Blood, for instance, has an acoustic impedance of 1.66 MRayl. The liquid sample may partially penetrate the acoustic decoupling layer, although this is not necessary.

BRIEF DESCRIPTION OF THE DRAWINGS

Embodiments of the invention will now be described by way of example with reference to the accompanying drawings in which:

FIG. 1b shows an enlarged perspective schematic view of the active area of the top electrode of the structure of FIG. 1a.

FIG. 9a shows the real part of Y(S) for the TSM resonance in water for devices tested.

FIG. 9b shows the real part of Y(S) for the TLM resonance in water for devices tested.

FIG. 9c shows box and whisker diagrams for the $Q_r$ in deionized (DI) water for the thickness shear mode (TSM) of 5 devices measured in each type.

FIG. 9d shows box and whisker diagrams for the $Q_r$ in deionized (DI) water for the thickness longitudinal mode (TLM) of 5 devices measured in each type.

FIGS. 10(a)-(d) show plots showing the performance of tall (about 30 μm) VA-CNTs in a solution of 2.5 mg/mL of BSA solution on the real part of Y(S) of:

FIG. 10(a) the shear mode (fS=1:12 GHz).

FIG. 10(b) the longitudinal mode (fL=1:9 GHz).

FIG. 10(c) the Q at resonance (202) and anti-resonance (256)) for the shear mode.

FIG. 10(d) the Q at resonance (204) and anti-resonance (312) for the longitudinal mode.

FIG. 14(a) immediately after CNT growth.

FIG. 14(b) dried after a deionised water droplet has been added.

FIG. 14(c) dried after IPA has been added showing exposed resonator surface.

FIG. 14(d) showing voids left after IPA densification.

Figure 1A:
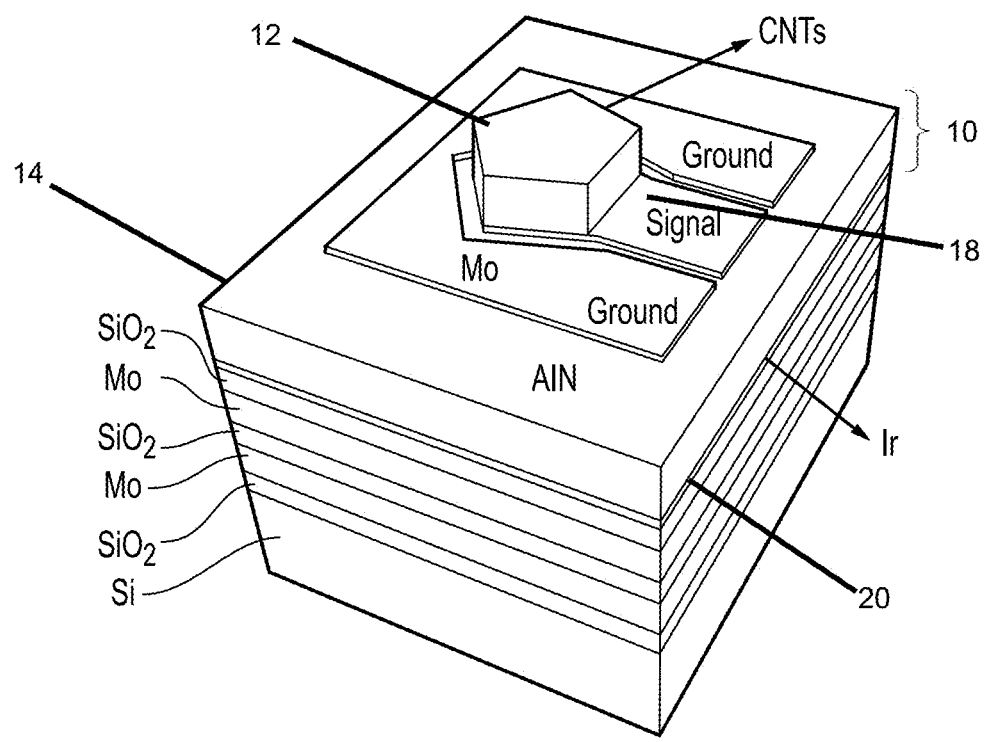
FIG. 1a shows a perspective schematic of a solidly mounted resonator (SMR) structure fabricated on Si, including a 5 layer acoustic reflector, piezoelectric AlN layer, the top electrode including VA-CNTs, for use in an embodiment of the invention.

DETAILED DESCRIPTION OF THE PREFERRED EMBODIMENTS, AND FURTHER OPTIONAL FEATURES OF THE INVENTION

In recent years the need for miniature, low cost, label-free and ultra-sensitive chemical and biological sensors has grown significantly. Gravimetric sensors based on acoustic resonators may be beneficial in achieving these objectives. Quartz crystal microbalances (QCMs) are the most well-established gravimetric sensors; these operate generally in the shear mode [Lu, 1972; Benes, 1984]. Mass accretion on the sensor surface (which can be functionalised to only permit certain molecules to attach) decreases the resonant frequency of the sensor, $f_r$; this is the basis for sensing. This frequency shift, $\Delta f_r$, and hence the mass sensitivities, $S_m$, are proportional to $f^2$ according to the Sauerbrey equation [Sauerbrey, 1959]. Better sensitivities may therefore be achievable by operating at higher frequencies. Thin film technology has led to emergence of thin film bulk acoustic wave (BAW) resonators operating in the range of 1-5 GHz.

BAW resonators generally consist of a thin piezoelectric slab of aluminium nitride (AlN) or zinc oxide (ZnO) "sandwiched" between two metallic electrodes [Flewitt, 2015]. The application of an AC signal across the electrodes generates a standing wave in the piezoelectric layer, which resonates at a frequency that is dependent on the film thickness [Rosenbaum, 1945]. There are two general types of BAW resonators: film bulk acoustic resonators (FBARs) and solidly mounted resonators (SMRs). FBARs and SMRs are different in the way the acoustic wave is confined. Typically, FBARs use air for acoustic isolation. Typically, SMRs use an acoustic reflector consisting of layers alternating between low acoustic impedance and high acoustic impedance [Aigner, 2003; Garcia-Gancedo, 2013]. High frequency thin film BAW resonators normally operate in the thickness longitudinal mode (TLM) which is excited in piezoelectric films with a c-axis oriented parallel to the surface normal. Thus the application of an AC signal causes the mechanical deformation to be parallel to the direction of wave propagation [Auld, 1990]. Biosensing with such longitudinal mode thin film BAW resonators is usually performed in dry conditions, because the TLM couples efficiently into liquids, which may lead to severe damping (>90% drop in quality-factors at resonance, Q). This generally prevents TLM resonators from being used in liquid environments, which is a major hindrance for both chemical and biological sensing as it requires surfaces to be dry when measurement takes place. The thickness shear mode (TSM) is instead preferred because it does not compress in liquids and hence has lower attenuation [Wingqvist, 2010].

In-liquid TSM resonators in the GHz regime have already been shown in real-time measurements of antibody-antigen binding [Weber, 2006], study of DNA hybridization [Gabl, 2004; Nirschl, 2009], and organophosphorus pesticide detection [Chen, 2013]. TSM resonances can be excited by using a piezoelectric layer with a c-axis inclined between 20° and 40° with respect to the surface normal. This may be achieved by an off-axis growth of the film [Wingqvist, 2007; DeMiguel-Ramos, 2015; DeMiguel-Ramos, 2017; Clement, 2014]. Both the shear and the longitudinal modes are excited (quasi-shear mode) in such piezoelectric films, with the shear mode typically resonating at a lower frequency compared with the longitudinal mode. Nonetheless, damping may still occur when the shear resonance propagates through more viscous liquids [Rughoobur, 2016; Qin, 2011]. Additionally, the shear mode thin film BAW resonators compromise their sensitivity to be only around one-third that of a typical longitudinal mode device with similar dimensions, due to its lower operating frequency [Weber, 2006].

The scalability of fabricating such inclined c-axis films may be limited compared to the highly oriented c-axis films due to significant and expensive modifications necessary for the depositions as reported in previous works [Yanagitani, 2007]. It would therefore be preferably to find a means of using the TLM for in-liquid sensing. Different methods have been attempted in several previous works to reduce damping in liquids such as confining the liquid using microchannels [Xu, 2009; Xu, 2011], however improper channel thicknesses can lead to exponential decay of the TLM. In-liquid sensing using the second harmonic of the TLM has also been reported, although this can lead to a lower Q of around 40, which compromises measurement of the frequency shift and hence sensitivity [Zhang, 2005]. Pottigari and Kwon [Pottigari, 2009] designed FBARs using a vacuum gap isolation created by fabricating parylene microposts for resonators with lower damping with Q of about 140 in liquid. Nonetheless vacuum gapped FBARs have not been explored fully yet. Furthermore, parylene is fragile and hence may be prone to collapse. Therefore a robust interface layer that can prevent liquids from direct contact with the active area, while increasing the sensitivity of the biosensors is desirable. The present inventors have developed a new approach to using TLM devices for mass sensing in liquid environments. An interface layer is added between the resonator and the liquid. This is designed so that the resonant acoustic wave preferably penetrates only partially into the interface layer, and preferably does not penetrate into the bulk liquid. The interface layer itself may be functionalised to allow mass attachment (from molecules in the liquid) which is detected by the resonant acoustic wave. In this way, the interface layer can decouple the resonant device from the process of mass attachment from the liquid whilst retaining mass sensitivity. The dual-purpose acoustic decoupling and mass attachment layer may conveniently be a carbon nanotube (CNT) layer, although the inventors consider that a number of other materials may be suitable for use as the acoustic decoupling layer. Other examples of possible materials suitable for use as an acoustic decoupling layer may include, but are not limited to, polydimethylsiloxane (PDMS), parylene, and SU-8.

For reference, the acoustic impedance of various materials is set out in the table below.

TABLE 1 acoustic impedance of selected materials

| Material | Density (kg/m$^3$) | $V_{long}$ (m/s) | $Z_{acoustic\ long}$ (Mrayl) |
|---|---|---|---|
| AlN | 3300 | 11000 | 36.3 |
| Mo | 10300 | 6290 | 64.787 |
| Porous SiO$_2$ | 2000 | 5210 | 10.42 |
| Dense SiO$_2$ | 2200 | 6200 | 13.64 |
| W | 19250 | 5180 | 99.715 |
| Ir | 22350 | 5350 | 119.5725 |
| Ta$_2$O$_5$ | 7900 | 4920 | 38.868 |
| ZnO | 5680 | 6075 | 34.506 |
| WO$_3$ 75% O$_2$ | 6700 | 4000 | 26.8 |
| WO$_3$ 64% O$_2$ | 6700 | 4500 | 30.15 |
| Ta | 16000 | 4500 | 72 |
| Si$_3$N$_4$ | 2200 | 9900 | 21.78 |
| SiOC | 1500 | 2400 | 3.6 |
| CNTs | 100 | 2000-62000 | 0.2-6.2 |
| PDMS | 1050 | 476 | 0.5 |

Owing to their excellent electronic and mechanical properties (Stiffness coefficient of about 1 TPa, acoustic velocity of about 62000 m/s) [Treacy, 1996; Iborra, 2013], CNTs have great potential for use in applications ranging from molecular electronics to ultrasensitive biosensors. Their biological compatibility and affinity provides them with specific chemical handles that would make several of these applications possible [Wang, 2003]. The larger surface area to volume ratio of CNTs can make them an attractive alternative to metallic electrodes for improving the sensitivities and detection limits of such resonators. Indeed CNT integration on the surface can increase the binding area without substantially increasing the size of the devices. Consequently, for the same concentration of biological samples, a larger number of targeted molecules can be bound onto the resonator surface compared to devices with metal electrodes; both ZnO [Garcia-Gancedo, Al-Naimi, 2011] and AlN [Garcia-Gancedo, Zhu, 2011] resonators with higher sensitivities due to the presence of a CNT layer have already been demonstrated in air using the TLM. In addition, CNTs having lower density (1.3 g/cm$^3$) [Mann, 2010] which, depending on their morphology, can reduce mass loading and their acoustic impedance, can be designed to ensure maximum confinement of the acoustic wave in the piezoelectric material [Iborra, 2013].

When the CNTs are grown directly on the substrates, they can form different morphologies depending on their number density. With number densities as high as about 10$^{11}$-10$^{13}$ cm$^{-2}$, the growth of vertically-aligned (VA) CNT forests may be desirable in certain applications [Zhong, 2012]. Although in this work only the forest number density will be considered, the low mass densities of CNT forests ranging from 0.03 g/cm$^3$ [Fubata, 2006] to 1.6 g/cm$^3$ [Sugime, 2014] can reduce mass loading on the resonators compared with the use of metals. Depending on their morphology, CNTs can have different acoustic impedances, which can be tuned to ensure a sufficient mismatch with the acoustic impedance of the piezoelectric material to yield appropriate confinement of the acoustic wave in the piezoelectric resonator [Iborra, 2013; Mann, 2010]. CNTs offer an additional benefit compared to metals in that it is possible to functionalize CNTs for direct covalent bonding to molecules, or with different types of polymers [Joddar, 2016] which could be used for non-covalent binding. This can prevent non-specific attachment or the need for additional binding layers. Ultimately, CNTs have a relatively simple chemical composition and atomic bonding configuration, being entirely composed of carbon atoms, which provide a natural match to organic molecules. Hence, the potential exists to use chemically-modified CNTs which would function as both the electrode and the sensing layer [Garcia-Gancedo, Iborra, 2011]. However, electrodes made only with CNTs may introduce parasitic resistances, which can deteriorate the Q factor at resonance, $Q_r$, in air [Esconjauregui, 2015].

In particular, in the following discussion of examples, the inventors propose either quasi-shear mode or thickness longitudinal mode AlN based SMRs, and a method of sensing an analyte in a liquid using such SMRs. Such devices are shown schematically in FIGS. 1a and 1b. The CNTs are grown by chemical vapour deposition (CVD) on the active area to function as a sensing layer and a layer to avoid direct contact with the liquids. The layer can therefore be considered a dual-purpose layer, acting simultaneously as (i) an acoustic isolation layer to reduce damping and (ii) a mass attachment layer. The impact of providing such a CNT layer on the TSM and TLM resonances are investigated and compared to resonators which do not have such a CNT layer. In the following examples, three different CNT densities are assessed ranging from densely packed CNT forests to "spaghetti"-like tubes. These three different densities are: 1) low density CNTs (LD-CNTs), 2) medium density CNTs (MD-CNTs) and 3) high density CNTs (HD-CNTs).

Materials and Methods

FIG. 1a shows a bulk acoustic wave resonator device comprising a resonator structure 10 and an acoustic decoupling layer 12. The resonator structure 10 comprises: a piezoelectric material layer 14; electrodes 18, 20 arranged to apply a driving signal to the piezoelectric material layer 14 to generate bulk acoustic waves; and a resonator structure surface 16 (see FIG. 1b). The resonator structure 10 has a resonator structure acoustic impedance and the liquid sample 30 (see FIG. 15) has a liquid sample acoustic impedance. The acoustic decoupling layer 12 is formed over the resonator structure surface 16. The acoustic decoupling layer 12 has an acoustic decoupling layer acoustic impedance. The acoustic decoupling layer acoustic impedance is: up to ⅕ times or not less than 5 times the resonator structure acoustic impedance, and up to ⅕ times or not less than 5 times the liquid sample acoustic impedance.

Figure 15:
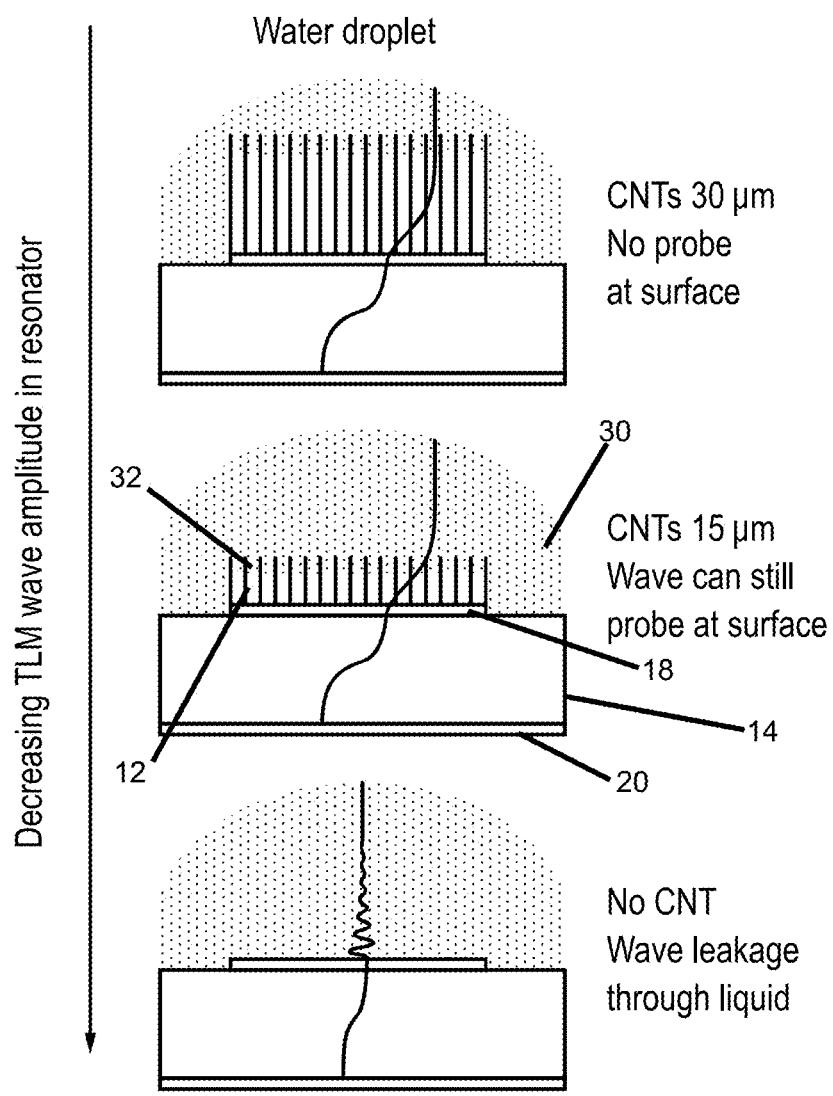
FIG. 15 shows illustrations of wave decay from the resonator structure into the acoustic decoupling layer (if present) and into the liquid, dependent on TLM wave amplitude in the resonator.

As shown in FIG. 15, the liquid sample 30 partially penetrates the acoustic decoupling layer 12 at region 32 of the acoustic decoupling layer 12.

In some embodiments, the acoustic decoupling layer 12 includes binding sites (indicated generally at 40) specific for an analyte in the liquid sample 30.

Fabrication of Shear and Longitudinal Mode Resonators

Figure 1B:
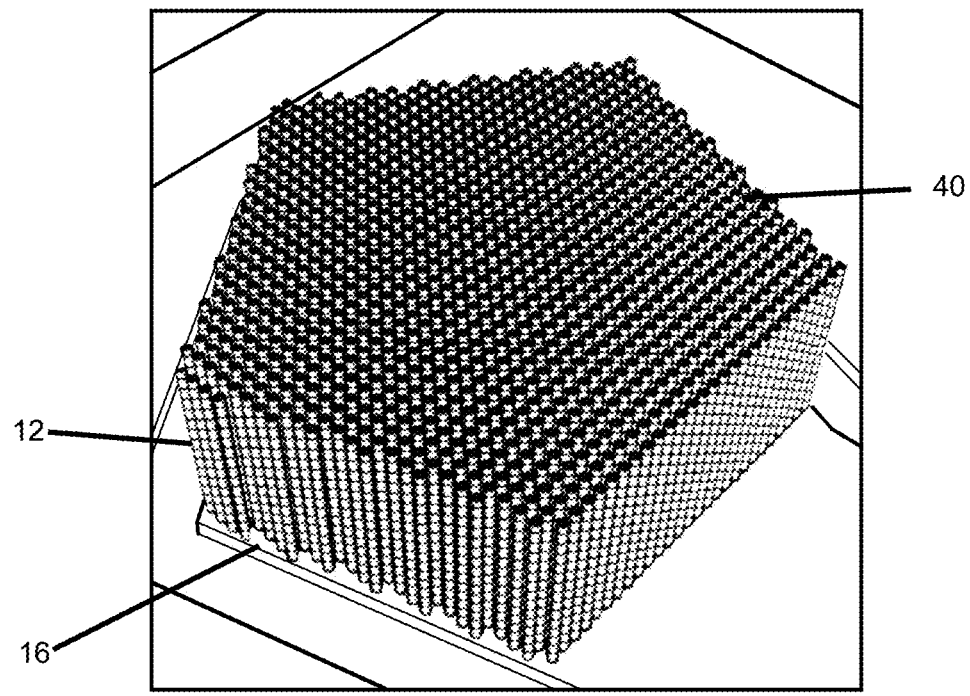
Figure 2:
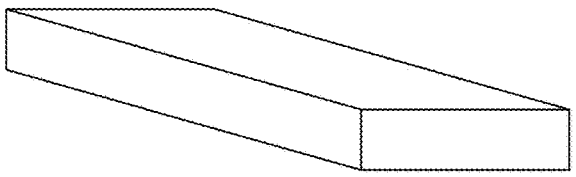
FIG. 2 shows schematically the fabrication process for producing a SMR with CNTs on the active area.
Figure 2:
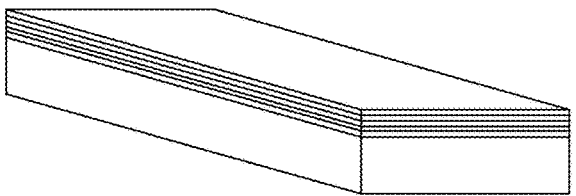
Figure 2:
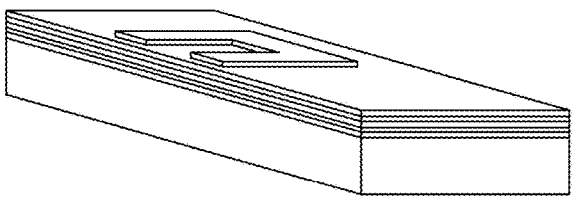
Figure 2:
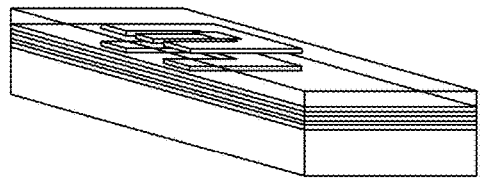
Figure 2:
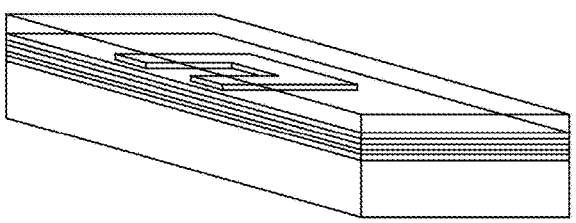
Figure 2:
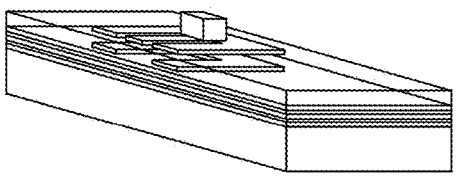
Figure 2:
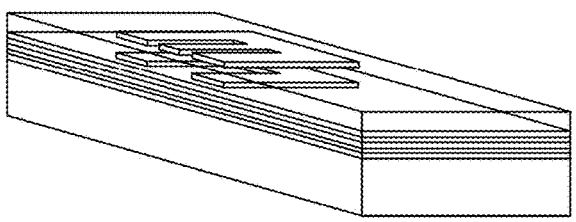

SMRs as shown schematically in FIG. 1a and FIG. 1b are fabricated according to a process shown schematically in FIG. 2. The process is set out in detail below, but broadly includes the following method steps:

1. Form a layer of n-type (100)-oriented Si
2. Thermal growth of SiO$_2$, Sputter Mo, SiO$_2$, Mo and SiO$_2$, perform chemical mechanical polishing
3. Deposit Ir electrodes and pattern using Mo hardmask
4. Deposit AlN seed, then piezoelectric AlN layer
5. Deposit Mo top electrode, pattern then etch
6. Pattern and deposit Al/Fe catalyst
7. Grow CNTs using CVD process The SMRs are fabricated on (100)-oriented, n-type, 500 µm thick Si wafers, which have been thermally oxidized (wet-oxidation) to obtain about 620 nm of SiO$_2$. Reflector layers consisting of Mo (about 650 nm) and SiO$_2$ (about 620 nm) are then sputtered sequentially in a Leybold Z500 sputtering system to achieve a reflection centred around a frequency of 2.2 GHz for the longitudinal mode. The top reflector layer is polished mechanically using alumina slurry to reduce the roughness to less than 2 nm. Ir (about 150 nm) is deposited as bottom electrode by electron beam evaporation and patterned by Ar ion-milling using a hard mask of Mo. AlN sputtering is performed in an in-house ultra-high-vacuum system, pumped to a base pressure below $8\times10^{-7}$ Pa. A pulsed DC source (MKS ENI 235, Andover, Mass., USA) operating at 250 kHz powers a high purity (99.999%), 150 mm diameter Al target. An AlN seed layer is grown prior to the piezoelectric AlN, at high pressure (0.66 Pa) and 600 W without intentionally heating or biasing the substrate. With these conditions seed layers with mainly (103) orientation are deposited, which is beneficial for promoting the growth of the subsequent AlN films with inclined grains. AlN films with the wurtzite c-axis inclined up to 24° with respect to the surface normal in the substrates placed between 2 and 5 cm from the target axis.

Figure 3:
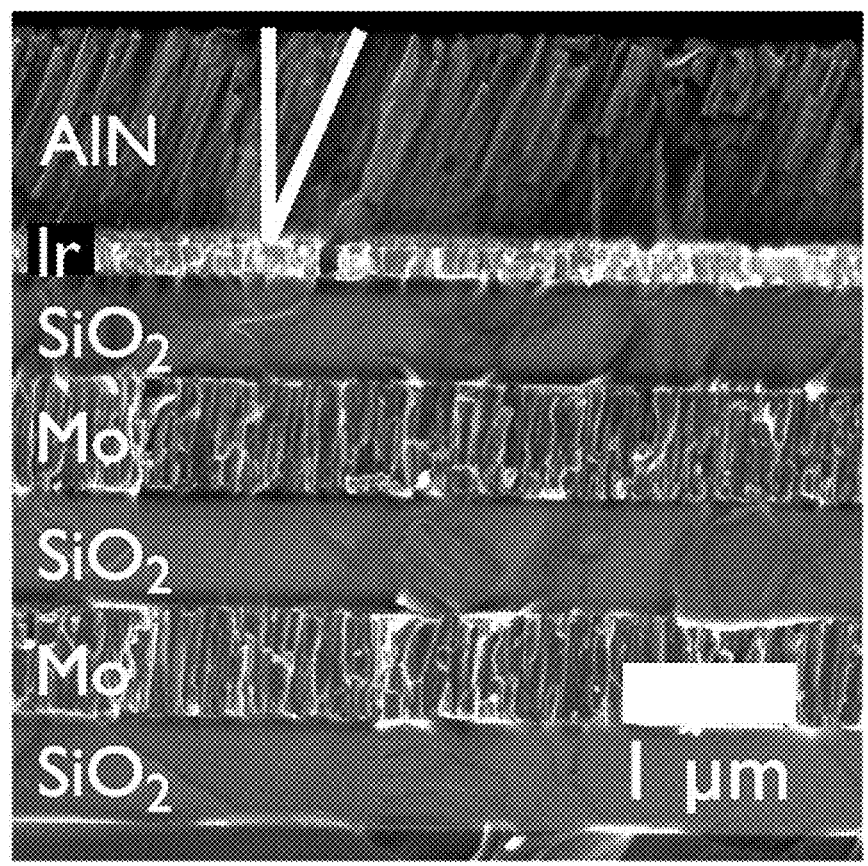
FIG. 3 shows an SEM cross-section of an inclined c-axis AlN SMR having a 5 layer reflector and an AlN film inclined at about 24° to the surface normal.

FIG. 3 shows an SEM cross-section of an inclined c-axis AlN SMR. We note that in a device for use in the method of the present invention, it is not necessary to provide an inclined c-axis film. Whilst in many of the examples disclosed herein, an inclined c-axis film is used to enable comparison of the effect of the acoustic decoupling layer on both the TLM and TSM, in a device according to some preferred embodiments of the invention, it is possible to use only the TLM. In such cases, an inclined c-axis film is not required. The piezoelectric AlN films (about 1-1.2 µm thick) are sputtered at lower pressure (0.27 Pa, in an admixture of 60% $N_2$ in Ar), maintaining the substrate at 550° C. and applying RF bias of −50 V to keep the residual stress below 200 MPa. The top electrode of Mo (about 150 nm) is sputtered in a DC magnetron sputtering system (Metallifier Sputter Coater, Precision Atomics, Cambridge, UK) from a 99.95% Mo target in a 0.35 Pa Ar atmosphere. This top electrode is then patterned by standard UV photolithography and dry etched with reactive ion etching using $CF_4/O_2$ chemistry. For the devices with CNTs, the active area (a pentagon inscribed in an 80 µm diameter circle) is defined using standard UV photolithography. Al (8 nm) and Fe (thickness ranging from 0.5 nm to 4.5 nm) are deposited in a thermal evaporator (E306, Edwards, West Sussex, UK) at a base pressure of $2\times10^{-4}$ Pa, and the samples are exposed to air after Al evaporation [Mirea, 2015; Olivares, 2015].

Growth of CNTs on Active Area

Multi-walled CNTs are grown on the devices by chemical vapor deposition (CVD) method in a cold wall chamber (Black Magic, Aixtron S E, Herzogenrath, Germany), The substrates are loaded in the chamber, which is then evacuated to a base pressure of 6.0 Pa with a rotary pump. Ammonia ($NH_3$) is introduced at a rate of 100 sccm in the chamber to raise the pressure to 16 Pa and stabilized for 30 s. $NH_3$ is chosen as a reducing gas since it is typically more efficient than $H_2$ to reduce catalyst particles to its metallic state especially at low temperature [Hofmann, 2009], The substrate is subsequently heated up from room temperature to the growth temperature (ranging from 450° C. to 650° C.) at a rate of 3° C./s and stabilized for 300 s. This ramping rate is chosen as a compromise to prevent delamination of the layers while avoiding Oswald ripening of the catalyst. Upon heating, the Fe catalyst is reduced and dewets to form nanoislands. By varying the thickness of Fe (from 0.5 nm to 4.5 nm), different sizes of nanoislands are formed. Different sizes of nanoislands can lead to CNTs with different densities and thicknesses. After the annealing step, the carbon feedstock acetylene ($C_2H_2$) is added to commence growth. The ratio of $NH_3$ and $C_2H_2$ is 1:1 to prevent the deposition of amorphous carbon during the growth, which is carried out at a pressure of 32 Pa. After the growth time has elapsed, the heater is turned off, $C_2H_2$ and $NH_3$ are switched off before flowing Ar (200 sccm) until the system cooled down to room temperature. Attempts are also made with ZnO as a piezoelectric material, however the ZnO film reacts with $NH_3$ and is reduced to Zn. A passivation layer that remains unreacted in the annealing step is therefore advantageous to protect ZnO for CNT growth on the active area.

Figure 4:
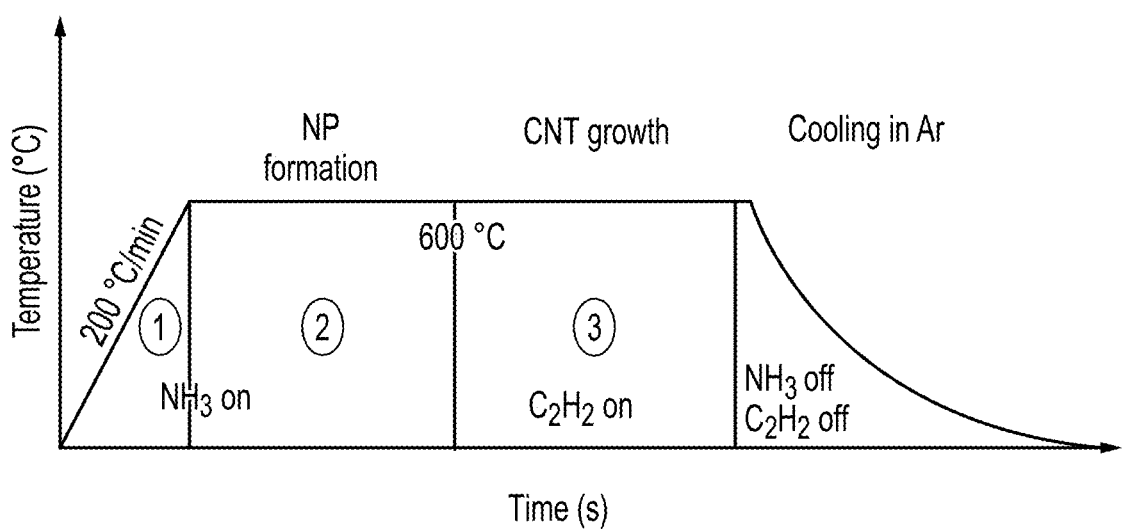
FIG. 4 shows a schematic graph of temperature against time for one method of producing CNTs on the active area of a resonator device.

FIG. 4 shows a schematic graph of temperature against time for a typical method of growing CNTs as discussed above. In this graph, the substrate is ramped at 200° C./min in $NH_3$ until it reaches 600° C. (Stage 1), then is stabilized for 5 mins to form nanoparticles (Stage 2) before $C_2H_2$ is added to commence growth. Finally both $NH_3$ and $C_2H_2$ are turned off (Stage 3) and the substrate is cooled in Ar.

CNT Characterization

CNTs are characterized using field emission FE-SEM (LEO 1530VP scanning electron microscope, LEO electron microscopy Inc, New York, USA) using an acceleration voltage ranging from 0.5 keV to 5 keV. Cross-sections of cleaved samples, onto which the CNT forests have been grown, are analyzed to assess the height and forest density of the CNT layer in more detail. The CNT structures are also assessed by Raman spectroscopy (inVia confocal Raman microscope, Renishaw plc, Gloucestershire, UK) using a 532 nm wavelength laser. The scan range is chosen to be from 1000 $cm^{-1}$ to 3500 $cm^{-1}$ as there were no peaks at lower wavenumbers to suggest the presence of SWCNTs.

Figure 5:
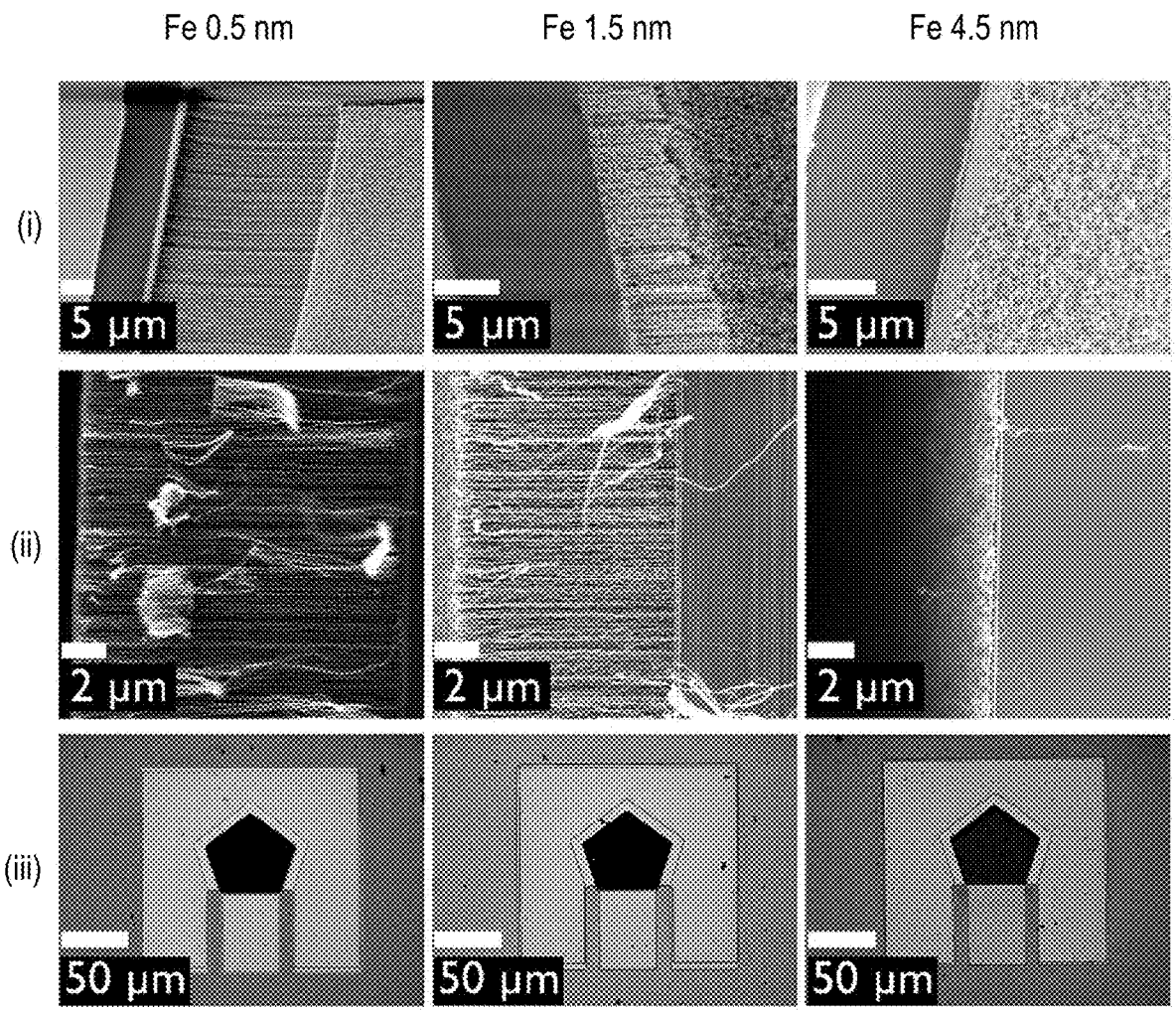
FIG. 5 shows, for three different Fe thickness values, (i) side view SEM images of CNT forests; (ii) cross-sectional cuts of the samples to show thickness and spacing of CNTs; and (iii) top-view optical microscope images of the devices.

Scanning electron microscope (SEM) images shown in FIG. 5 (i) and (ii) illustrate the different forest heights obtained with different Fe thicknesses from 0.5 nm to 4.5 nm. In FIG. 5 (i), inclined images of the forest on top of the electrode of a device are illustrated, whereas in (ii) the cross-sectional cut of the forests grown on Si wafers are depicted, From the SEM images, it is observed that when the thickness of the Fe catalyst is decreased from 4.5 nm to 0.5 nm the forest height increases from <1 µm to approximately 15 µm for a growth time of 3 minutes. In addition using a thinner catalyst layer causes the CNT forests to become more packed, and hence their area density increases. This is because smaller nanoparticles are formed and the individual tubes are closer to one another leading to tall VA-CNTs [Robertson, 2008]. Where the Fe thicknesses exceeds 4.5 nm, the CNT layer tends to be more "spaghetti"-like with random orientation and a lower area density. A good temperature to activate the Fe catalyst for the growth and to reduce delamination of the SMR reflector layers is found to be at or around 600° C., e.g. between 590-610° C., although lower or higher temperatures are possible. A rate of rise of 3° C./is chosen to allow nanoparticle (NP) formation and avoid film delamination in the annealing step. At 600° C., the growth rates are found to be approximately 5 µm/min, 3 µm/min and 0.2 µm/min for Fe thicknesses of 0.5 nm, 1.5 nm and 4.5 nm respectively as shown in FIG. 5 (ii).

Figure 6A:
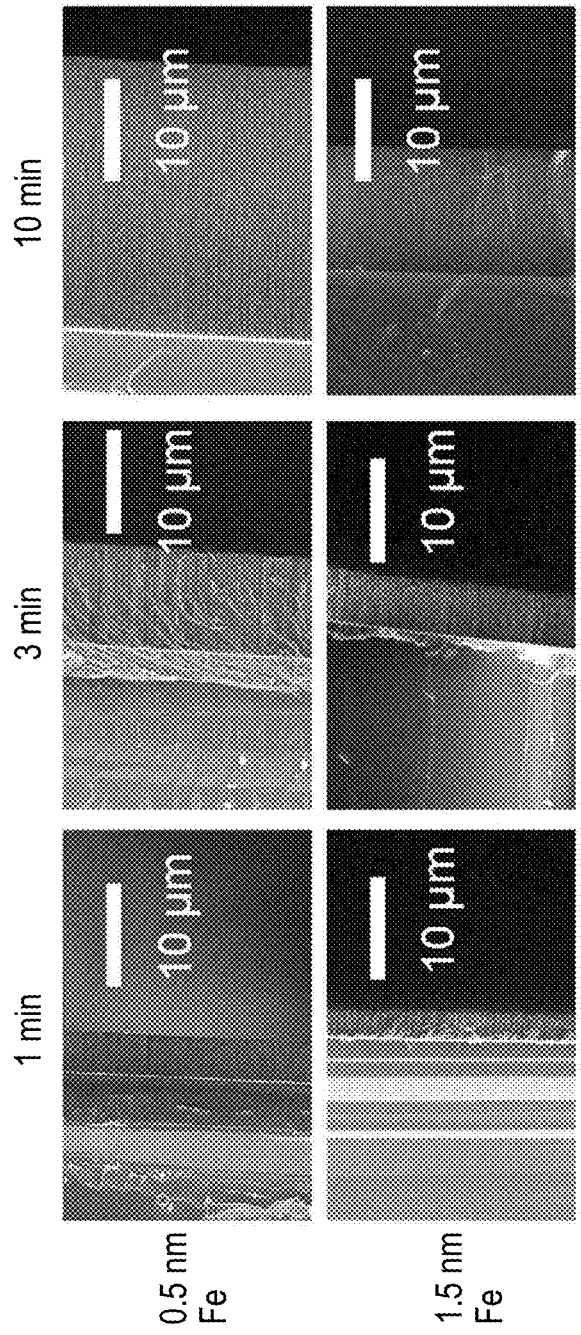
FIG. 6(a) shows SEM cross-sections of cleaved samples having CNTs grown on 0.5 nm and 1.5 nm of Fe at different growth times.
Figure 6B:
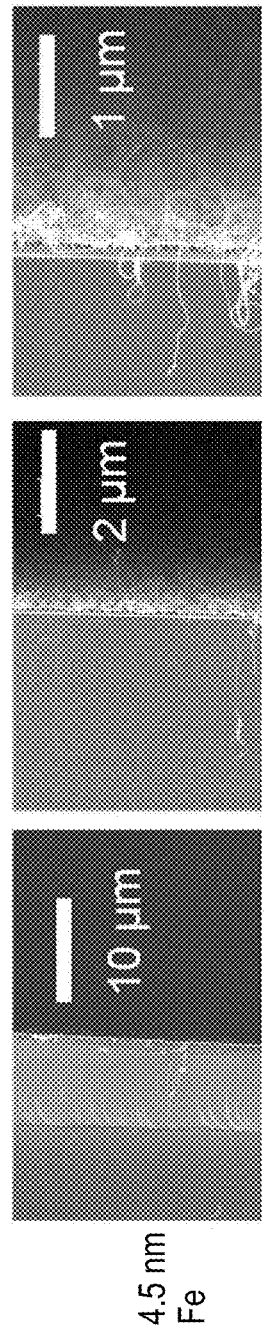
FIG. 6(b) shows SEM cross-sections at different magnifications of cleaved samples having CNTs grown on 4.5 nm Fe for 3 minutes.

FIG. 6 shows SEM cross-sections of cleaved samples onto which the CNTs have been grown. For samples with Fe thicknesses of 0.5 nm and 1.5 nm, the growth is monitored over a period of 10 minutes, and SEM cross-sections (FIG. 6(a)) are taken at 1 minute, 3 minutes and 10 minutes of growth. For the samples with a FE thickness of 4.5 nm, the growth is monitored over a period of 3 minutes and cross-sections (FIG. 6(b)) are taken at increasing magnifications at 3 minutes of growth. From these cross-sectional SEM micrographs, estimates for the area densities of the CNT forests are obtained (shown in Table 1, below) as about $0.3\times10^{10}$ $cm^{-2}$ denoted as the low density (LD) CNTs with 4.5 nm Fe, about $1.4\times10^{10}$ $cm^{-2}$ corresponding to medium density (MD) CNTs with 1.5 nm Fe, and about 2.2×10$^{10}$ cm$^{-2}$ for high density (HD) CNTs with 0.5 nm Fe.

With 4.5 nm Fe, the tubes grow in a random "spaghetti"-like morphology. The growth rate may be difficult to estimate with this kind of CNTs. Therefore higher magnification images are obtained to estimate the thickness of the layer. The growth rate does not change significantly as the tubes are randomly oriented and are not vertically aligned. Estimation of the number of tubes in the forest is carried out using the SEM images. Five sets of 2 μm length regions are chosen and visible tubes are counted manually as measurements M1, M2, M3, M4 and M5 respectively. An average of the number of tubes in each set is shown in Table 2. This method gives a comparison of the number of CNTs in a region.

TABLE 2

| Fe (nm) | M1 | M2 | M3 | M4 | M5 | Average per cm$^2$ (10$^{10}$) |
|---|---|---|---|---|---|---|
| 4.5 | 8 | 10 | 9 | 14 | 13 | 0.3 |
| 1.5 | 24 | 25 | 26 | 20 | 23 | 1.4 |
| 0.5 | 30 | 32 | 28 | 27 | 30 | 2.2 |

Optical microscope (OM) images shown in FIG. 5 (iii) confirm the presence of the CNT forests on the active area of the SMRs. Shorter CNT forests are in focus with the resonator surface as in the case with the 4.5 nm Fe example, whereas taller CNTs are out of the focus plane in the case of the 0.5 nm Fe and 1.5 nm Fe examples. Additionally a change in the transparency of the active area of the SMRs can be observed from the dense CNT forests to the lowest density CNT layer, indicating the reduced CNT packing which results from thicker catalyst.

Figure 7:
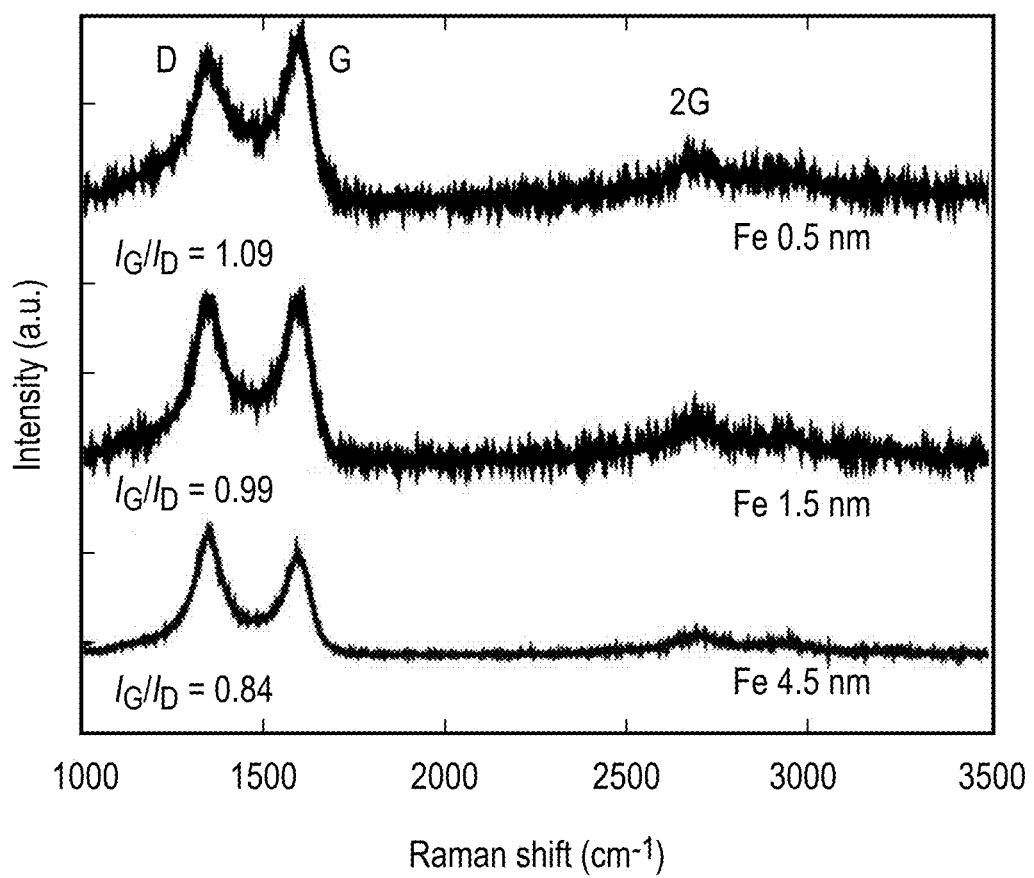
FIG. 7 shows Raman spectra of three different morphologies of CNT grown on different thicknesses of Fe.

The Raman spectra displayed hi FIG. 7 show the presence of both G-peak at 1583 cm$^{-1}$ and D-peak at 1350 cm$^{-1}$, which are typical peaks for multi-wall CNTs in all the different CNT morphologies grown. The intensity ratio of the G-peak to the D-peak ($I_G/I_D$) of 1.1 with 0.5 nm Fe illustrates a slightly reduced disorder in the CNT forest, while at 1.5 nm Fe the D-peak becomes higher indicating the deterioration of crystallinity of the CNT, Similarly with 4.5 nm Fe the $I_G/I_D$ is further reduced to 0.84, thereby demonstrating lower crystallinity in the CNTs grown with a thicker Fe layer.

Device Characterisation

Method

The devices are electro-acoustically characterized on a coplanar probe station using ground-signal-ground (G-S-G) probes with 150 μm pitch (Picoprobes, GGBindustries Inc., Naples, Fla., USA). A network analyzer (Model E5062A, Keysight Technologies, Santa Rosa, Calif., USA) is used to measure the frequency response of the devices from 0.5 to 3.0 GHz. The frequency corresponding to the maximum of the real part of the electrical admittance, Y, is considered as $f_r$. The frequency corresponding to the maximum of the real part of the electrical impedance, Z is considered as $f_a$. To assess the resonator performance, Qr and effective electromechanical coupling, $k_{eff}^2$, coefficient are determined from standard definitions [Iborra, 2013]:

$$Q = \frac{f_r}{2} \frac{d\Phi_Y}{df}\bigg|_{f=f_r}$$

$$k_{eff}^2 = \frac{\pi}{2} \frac{f_r}{f_a} \frac{1}{\tan\left(\frac{\pi}{2} \frac{f_r}{f_a}\right)}$$

where $\phi_Y$ is the phase of Y.

50 μL of deionised (DI) water is added by a micropipette on top of the resonator to determine the performance of the device with CNTs in liquids. For in-liquid mass sensing, BSA dissolved in water with a concentration of 20 mg/mL (B86657-5 mL) is purchased from Sigma Aldrich Ltd. This solution which is then diluted with DI water into 3 different concentrations: 50 μg/mL (1:399 BSA:DI water), 1000 μg/mL (1:19 BSA:DI water) and 2500 μg/mL (1:7 BSA:DI water). Pure DI water is initially used for each device tested to obtain the unloaded $f_r$. The device is subsequently dried. 50 μL of one of the three concentrations of BSA solution is dropped by means of a micropipette on the SMRs covering the GSG probe as well and the Y spectra are measured after 5 mins to allow the BSA to bind to the CNT. The SMR responses for the remaining BSA concentrations are then measured similarly.

Electro-Acoustic Characterisation of Devices

Figure 8A:
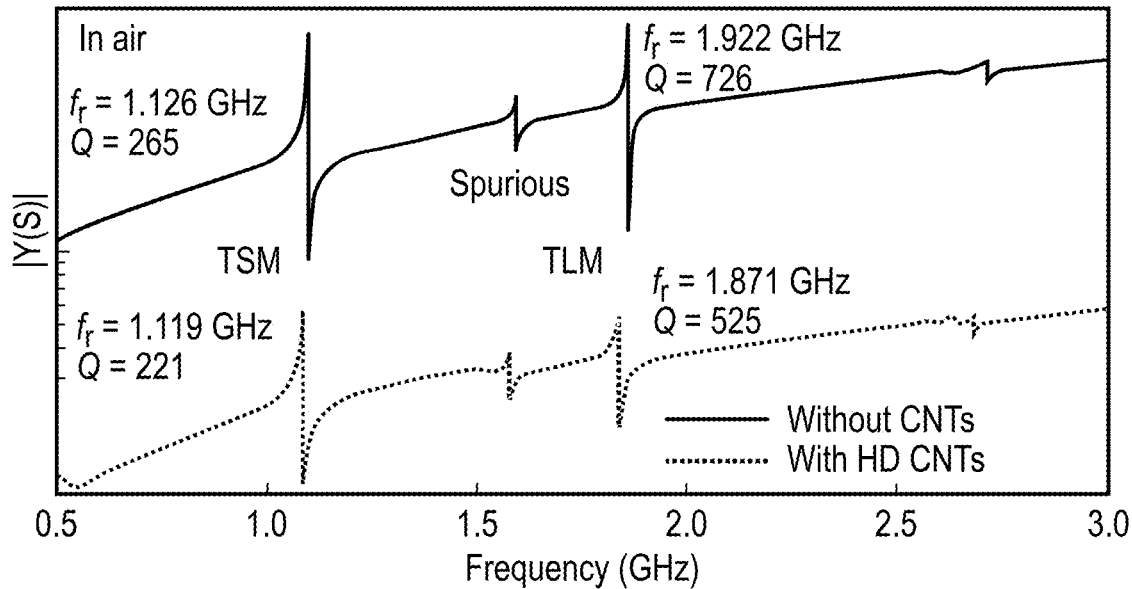
FIG. 8a shows admittance spectra of devices without CNTs and with CNTs on the active area, demonstrating a TSM at 1.12 GHz, a spurious mode at 1.6 GHz and a TLM at 1.89 GHz.
Figure 8B:
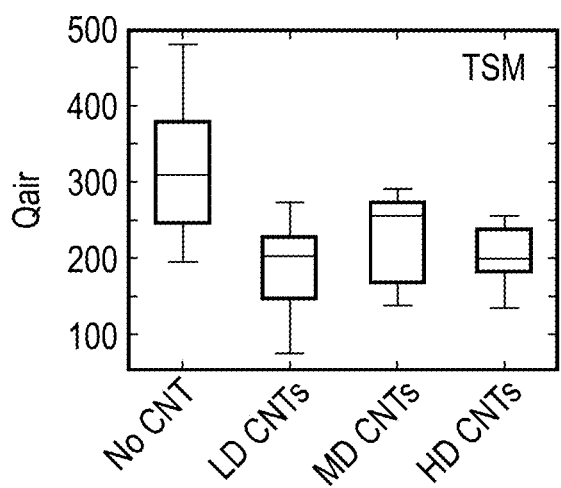
FIG. 8b shows box and whisker diagrams for the $Q_r$ in air for the thickness shear mode (TSM) at about 1.1 GHz of 5 devices measured in each type of SMRs.
Figure 8C:
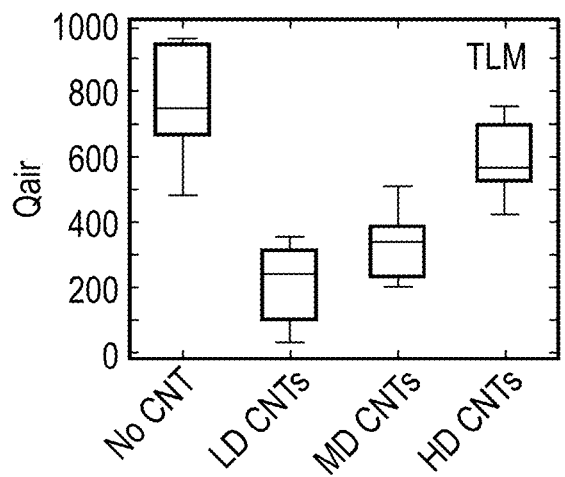
FIG. 8c shows box and whisker diagrams for the $Q_r$ in air the thickness longitudinal mode (TLM) at about 1.9 GHz of 5 devices measured in each type of SMRs.

The electrical admittance (Y(S)) spectra measured in the frequency range from 0.5 GHz to 3.0 GHz of the SMRs fabricated with and without CNTs are shown in FIG. 8*a*. Both a TSM and a TLM resonance are observed in the spectra with a spurious resonance of smaller amplitude at about 1.6 GHz (FIG. 8*a*). This spurious resonance may be caused by imperfections in the AlN and reflector layer thicknesses, which can lead to overtones in the frequency spectra. Inclinations of the AlN grains caused by the off-axis deposition are found to be approximately 24°, as depicted in FIG. 3, leading to quasi-shear and quasi-longitudinal resonances. These TSM and TLM resonances of the SMRs (average of 10 representative devices, and standard deviation as errors) are obtained at frequencies at (1.13±0.05) GHz and (1.94±0.07) GHz respectively as shown in FIG. 8*a*. Comparatively, it can be seen that devices with CNT forests on the active area demonstrate similar resonant frequencies (1.18±0.09) GHz and (1.91±0.06) GHz. The presence of the added CNT layer, and catalyst appears to have a minimal effect. The added CNT layer also causes a reduction in Q (in the range of 10% to 30%) compared to resonators without the CNT layer as observed in FIGS. 8*b* and 8*c*.

The average of the TSM and TLM (FIGS. 8*b* and 8*c*) in all the devices with CNTs are lower compared to SMRs without CNTs. The inventors theorise, without wishing to be bound by theory, that this is due to acoustic losses added by the presence of this layer; the low density CNTs may be particularly lossy because of their more scattered nature as observed by Raman spectroscopy. The effective electromechanical coupling coefficients, $k_{eff}^2$, for the TSM and TLM are found to be (1.7±0.2)% and (3.1±0.3)% respectively. Although these values are significantly lower than those reported for with AlN resonators [DeMiguel-Ramos, 2013; Yokoyama, 2012], it is necessary to consider that the focus of this work has been to achieve high Q, which can improve the precision of determining $f_r$ caused by low mass loads with sharper resonances.

In FIGS. 9*a* and 9*b*, the real part of the Y(S) spectra of the SMRs measured in de-ionized (DI) water with different CNT forest densities are compared with conventional SMRs without CNTs. SMRs with high density (HD) CNTs exhibit strong TSM and TLM resonances in DI water as compared with devices without CNTs. This is confirmed by the spectra shown in FIGS. 9*a* and 9*b*, which are normalized to their individual resonant frequencies for a clear comparison of the peak sharpness. It can be observed that the $Q_{water}$ of HD-CNTs is 141 and 167 for the TSM and TLM respectively. Although the TSM of a non-coated SMR exhibits a $Q_{water}$ of about 102, its TLM resonance is non-existent ($Q_{water}$ of about 3) as demonstrated by the wide resonance in FIG. 9b. The medium density (MD) CNTs and low density (LD) CNTs also have improved $Q_{water}$ for the TLM compared to devices without the CNTs as illustrated in FIG. 9d. The result is significant in that the TLM has a measurable Q in DI water because of the presence of the CNT layer on top. This is the first demonstration of a TLM resonance with a high Q-factor in a liquid environment.

In FIGS. 9c and 9d, boxplots of the $Q_{water}$ of 5 representative measured devices are displayed for the TSM and TLM respectively. It is observed that the presence of HD-CNTs on the active area can provide acoustic isolation between the resonator and the in DI water leading to a $Q_{water}$ higher than in the cases of the non-CNT SMRs. For the TLM $Q_{water}$ boxplot as illustrated in FIG. 9d, the Q in deionised water increases as the CNT forest density increases, suggesting the reduced contact of the DI water with the resonator surface. To quantitatively evaluate the acoustic leakage to the DI water, the dissipation factor, D, of ten representative SMR devices with different CNT thicknesses is calculated using:

$$D = \frac{1}{Q_{water}} - \frac{1}{Q_{air}}$$

where $Q_{air}$ is the unloaded Q in air, and $Q_{water}$ is the Q in a liquid environment.

Table 3 shows a quantitative analysis of the effect of different CNT forest densities on the average shear mode $Q_{air}$, $Q_{water}$, and the dissipation factor D. The standard deviation from the mean value is used to estimate the variability in the values.

TABLE 3

| Active area | $Q_{air}$ | $Q_{water}$ | D (%) |
|---|---|---|---|
| No CNTs | 320 ± 90 | 94 ± 20 | 0.75 ± 0.26 |
| Low density CNTs | 190 ± 60 | 54 ± 20 | 1.33 ± 0.65 |
| Medium density CNTs | 230 ± 60 | 94 ± 10 | 0.63 ± 0.20 |
| High density CNTs | 210 ± 40 | 110 ± 60 | 0.39 ± 0.23 |

In Table 3, D is calculated for the thickness shear mode (TSM) and it is observed that with the presence of medium and high density CNTs on the active area, D improves from (0.75±0.26)% to (0.63±0.20)% and (0.39±0.23)% respectively. Nonetheless with low density CNTs a higher acoustic leakage is observed as D increases to 1.33. This may be caused by the lower initial $Q_{air}$ of the devices.

Table 4 shows a quantitative analysis of the effect of different CNT forest densities on the average longitudinal mode $Q_{air}$, $Q_{water}$, and the dissipation factor D. The standard deviation from the mean value is used to estimate the variability in the values.

TABLE 4

| Active area | $Q_{air}$ | $Q_{water}$ | D (%) |
|---|---|---|---|
| No CNTs | 790 ± 180 | 3 ± 1 | 30.9 ± 11.7 |
| Low density CNTs | 220 ± 120 | 64 ± 40 | 1.09 ± 0.93 |
| Medium density CNTs | 340 ± 110 | 68 ± 30 | 1.19 ± 0.63 |
| High density CNTs | 590 ± 120 | 160 ± 60 | 0.45 ± 0.26 |

In Table 4 the corresponding values of D are calculated for the TLM and a remarkable reduction in acoustic leakage in DI water is observed (D decreases from 30% without CNTs to less than 1.5% by the presence of CNTs). Indeed without the CNTs, the TLM suffers from large acoustic damping in DI water, having Q values of only about 3-5, whereas with LD CNTs this Q value increases to about 64, and with HD CNTs, an average Q value of about 160, and D around about 0.45% is achieved in DI water. Using taller HD CNT forests of length 30 µm, devices with TLM $Q_{water}$ above 200 have been measured indicating that the TLM resonance is significantly isolated from the DI water droplet (see FIG. 10, discussed below). This can be explained by the acoustic impedance mismatch provided by the high forest density CNT layer, separating the resonator and the DI water. This mismatch may cause the TLM to remain partially confined in the device, hence achieving a high Q despite the presence of a DI water droplet. This acoustic impedance mismatch is achieved when the acoustic impedance of the acoustic decoupling layer, here a CNT layer, is up to ⅕ times or not less than 5 times the acoustic impedance of an uppermost layer of the resonator structure, and up to ⅕ times or not less than 5 times the liquid sample acoustic impedance.

A possible concern might be that the acoustic wave is so confined within the resonator that there is no longer any mass sensing ability of the device. Therefore, the ability of the CNT layer to both acoustically isolate the piezoelectric resonator from the liquid and allow detectable mass attachment is assessed using bovine serum albumin (BSA).

Figure 10A:
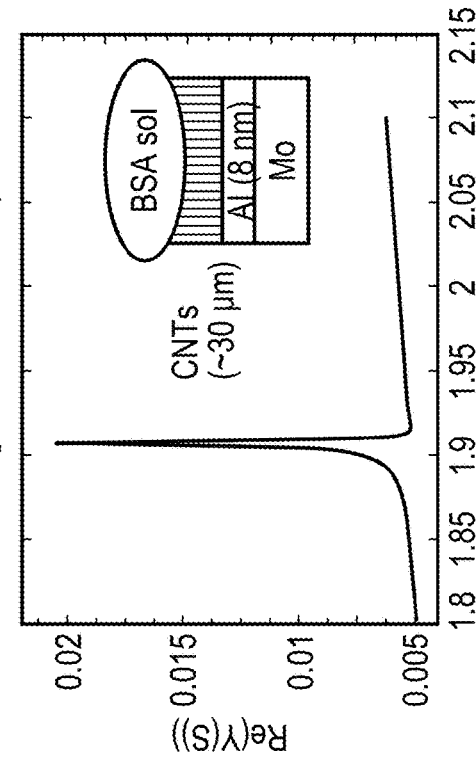
Figure 10B:
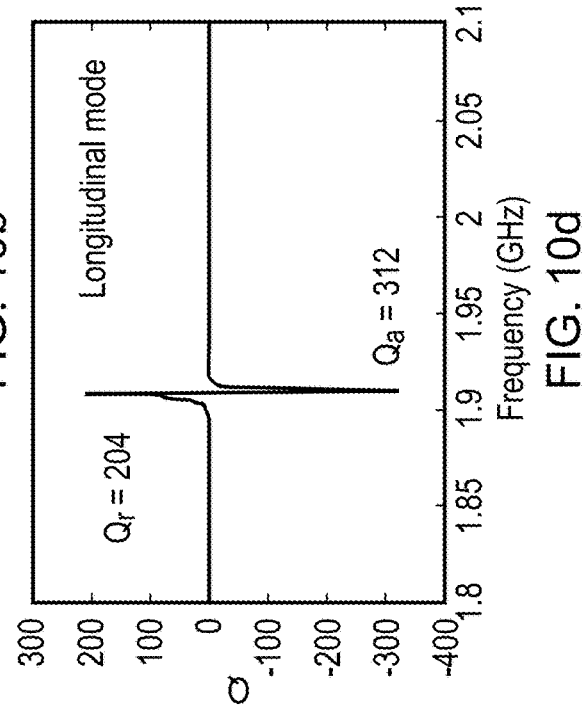
Figure 10C:
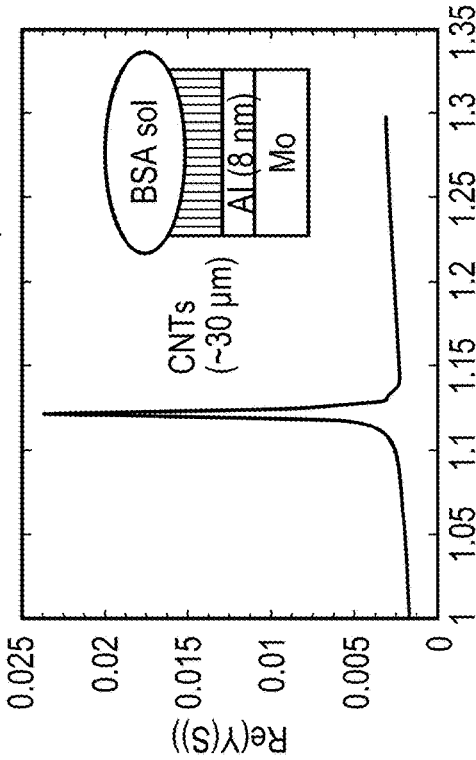
Figure 10D:
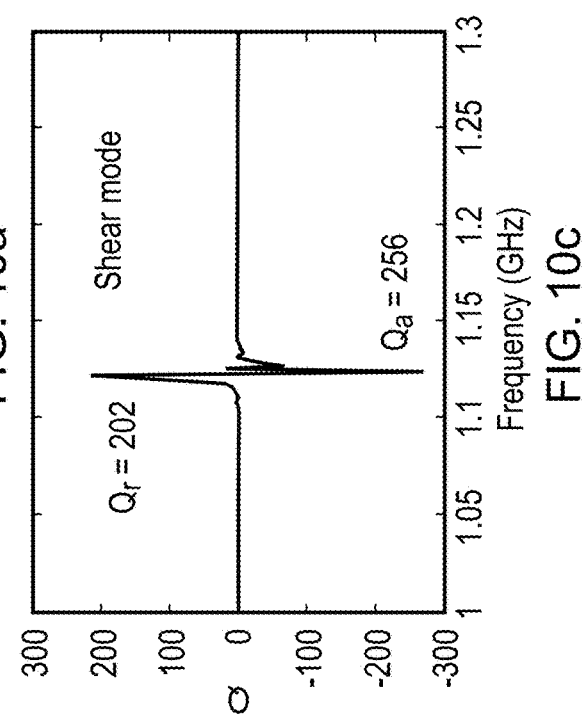

FIGS. 10(a)-10(d) show a series of plots showing the performance of tall (about 30 µm) VA-CNTs in a solution of 2.5 mg/mL of BSA solution on the real part of Y(S) of the shear mode ($f_S$=1:12 GHz) in FIG. 10(a), the longitudinal mode ($f_L$=1:9 GHz) in FIG. 10(b) and the Q at resonance (202) and anti-resonance (256)) in FIG. 10(c) for the shear mode and the longitudinal mode (Qr=204 and Qa=312) in FIG. 10(d).

With the addition of BSA solutions (even at the saturation concentration of about 2.5 mg/mL) on top of taller CNT forests (about 30 µm), there are no significant changes to the fr and Q as illustrated by the electro-acoustic responses in FIGS. 10(a)-10(d). High $Q_r$>200 are obtained in both the TSM (FIG. 10(c)) and the TLM (FIG. 10(d)) despite the presence of the high concentration BSA solution on top of the resonators. The results indicate a tall forest can become hermetic to the liquid.

Mass Sensitivity Assessment of Devices

Figure 11:
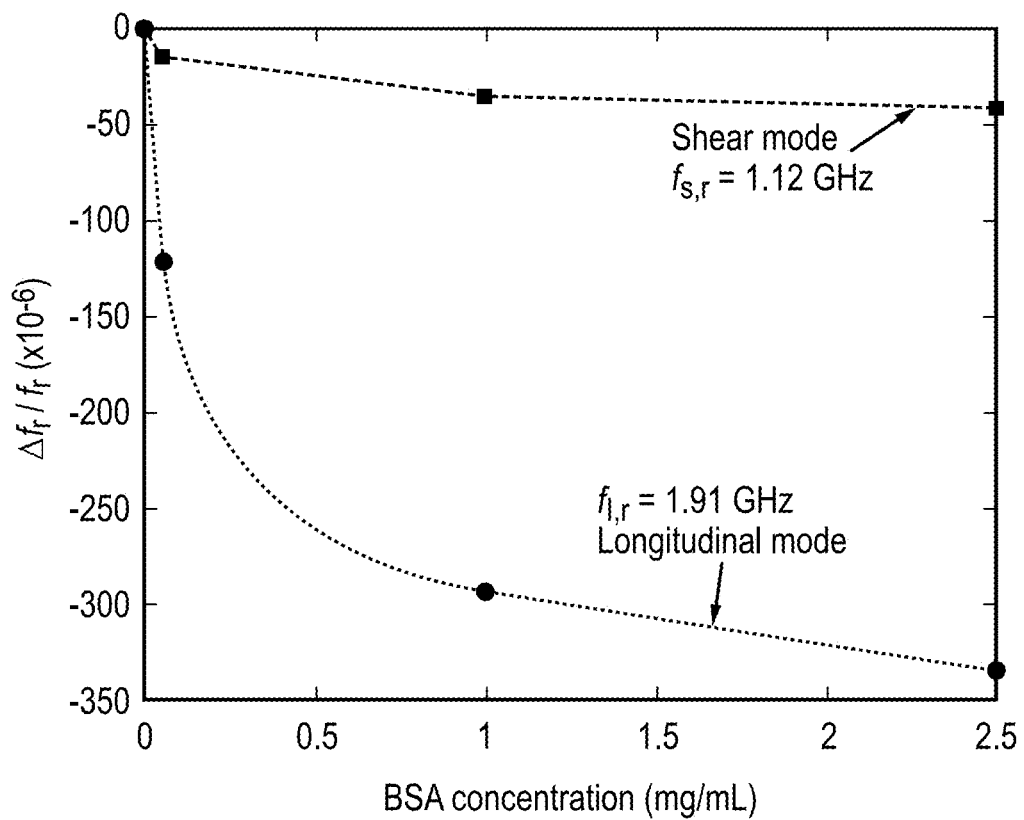
FIG. 11 shows a graph showing of the effect on the relative frequency shifts for the shear and longitudinal modes with different BSA concentrations. Dashed lines are guides for the eye.
Figure 12:
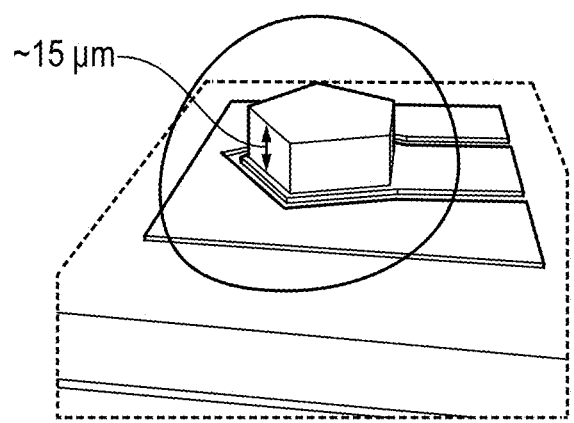
FIG. 12 shows a schematic perspective view of a droplet on top of a device having a 15 μm tall CNT forest.
Figure 13:
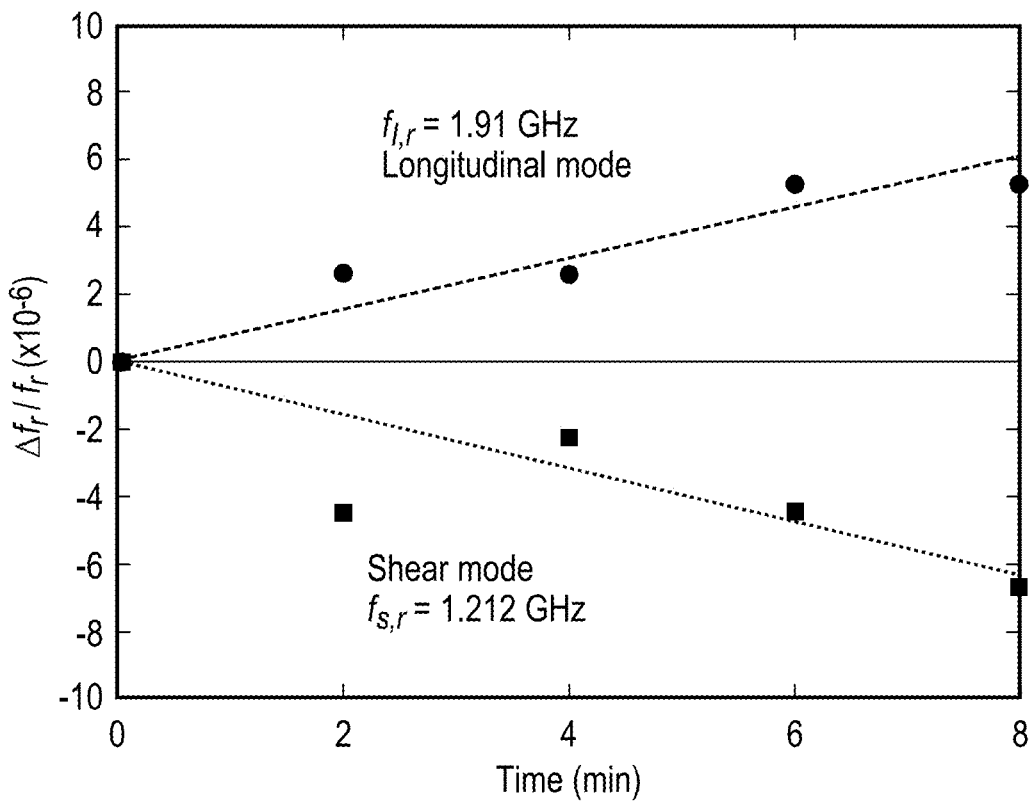
FIG. 13 shows the relative frequency shifts for the shear and longitudinal modes with time for a resonator with longitudinal mode Qr (about 200) achieved in liquid using VA-CNTs of about 30 μm in height. Dashed lines are guides for the eye.

The effect of this partial isolation on the SMRs mass sensitivity is assessed using bovine serum albumin (BSA). The effect of BSA solutions of concentrations ranging from 0.05 mg/mL to 2.5 mg/mL on both the TSM and TLM resonances with devices having about 15 µm tall CNT layers are shown in FIG. 11. BSA is chosen as it is water soluble and, owing to its typically high affinity to CNTs, it adsorbs easily on the CNTs. It is demonstrated in FIG. 11 that the TSM is shown to have smaller (approximately by 7× less) relative frequency shifts ($\Delta f_r/f_r$) compared to the TLM mode for the same BSA concentration. This may indicate the potential for improved performance using a TLM resonance in liquid. At higher BSA concentrations (>1 mg/mL), the relative frequency shift plateaus. This may be because all the exposed binding areas on the CNT forest are occupied and no further BSA solution can bind to the forest. From experiments carried out with taller HD-CNT forests of about 30 µm, negligible frequency shifts are observed in spite of using high BSA concentrations (2.5 mg/mL) as shown in FIG. 13, discussed below. These results confirm that the mechanical vibration to sense mass loading is dependent on the height of the CNT forest. For biosensor applications, the acoustic isolation layer should still allow the TLM to interact with the region where the biomolecules attach—the surface of the CNT forest is also the binding region for these SMRs. Therefore, the CNT forest height is preferably tuned to allow this dual function. However, the precision of this thickness tuning is not as critical as in some prior art methods, such as in the use of microchannels. The attenuation length of an acoustic wave in a given material is a function of its wavelength. Therefore, the thickness of a given material layer to act as a dual acoustic isolation and mass attachment layer will depend on the frequency of operation. The required thickness may also depend on the penetration depth of the mass binding process into the layer. The thickness of the acoustic decoupling layer is therefore preferably selected to be between $\frac{1}{8}\lambda$ and $50\lambda$ where $\lambda$ is the wavelength in the decoupling layer at the resonant frequency of resonator.

FIG. 13 shows the relative frequency shifts for the shear and longitudinal modes with time for a resonator with high longitudinal mode $Q_r$ (about 200) achieved in liquid using VA-CNTs of about 30 μm in height. Dashed lines are guides for the eye. The longitudinal mode has a positive shift compared to the shear mode and the $\Delta f_r/f_r$ are smaller (by 100 times) than with a resonator with lower $Q_r$ (about 150) in liquid.

Although a trend is evident as time progresses after dropping the 2.5 mg/mL BSA solution, the $\Delta_r$ are almost two orders ($10^{-6}$ for taller CNTs compared to $10^{-4}$ for 15 μm heights) of magnitude lower than in the case for a lower $Q_r$ (about 150 with about 15 μm CNTs) resonator in liquid. The positive $\Delta f_r$ in the case of the longitudinal mode may be caused by temperature drift due to evaporation of the BSA solution from the surface of the resonator, leading to surface cooling of the resonator. Nonetheless both the TSM and TLM shift by only a few kHz, which is just above the noise floor for frequency regimes higher than 1 GHz. In addition the concentration of the BSA solution is high enough to saturate the CNT forest of about 15 μm as demonstrated previously.

It is deduced that thicker CNT forests can improve the Q values in liquid by isolating the device completely from the liquid, yet this can reduce the mass sensitivity significantly to the extent that the SMR may no longer be suitable for gravimetric sensing. Hence a trade-off in the selection of the forest height and density may be necessary to achieve both a reasonable Q and mass sensitivities for the devices.

Nevertheless it is necessary to identify some preferred features when fabricating CNT forest to isolate the TLM resonance in liquid for biological detection. Firstly, it is possible for the forest to be so tall that there is no resonance at the liquid CNT interface. Secondly, the CNT forests may be densified when used in liquids that have low vapour pressure such as isopropyl alcohol (IPA) and acetone. This type of densification can consequently lead to voids, or can expose the resonator surface to the liquid, thereby leading to a significant dissipation.

Figure 14:
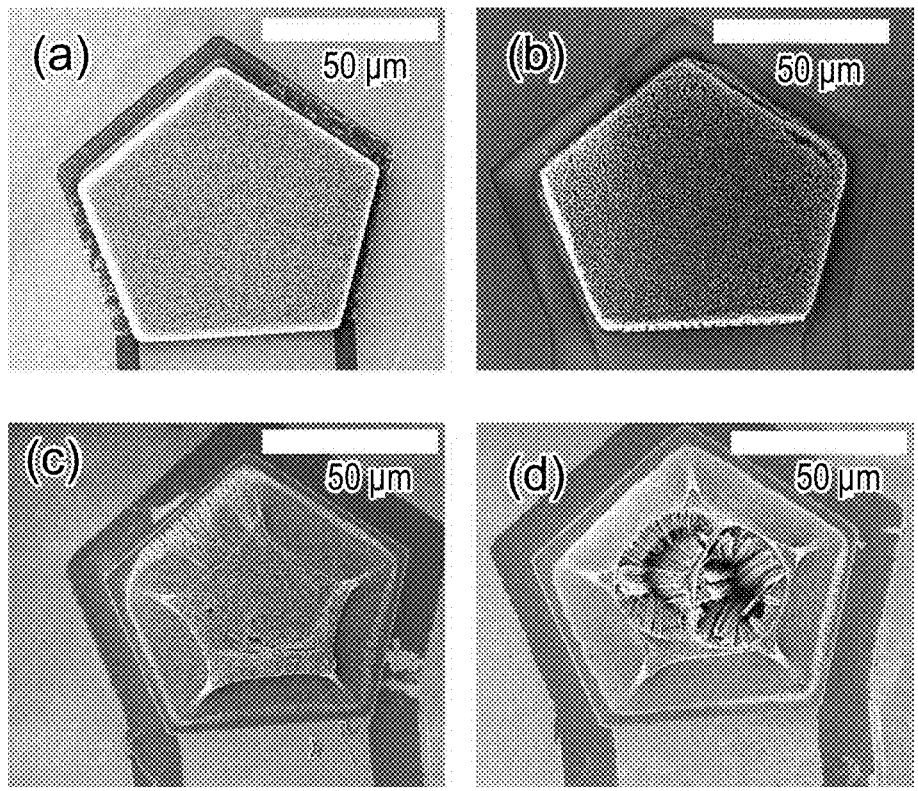
FIG. 14(a)-(d) show SEM images of an SMR with HD CNTs on the active area.

FIGS. 14(a)-14(d) show SEM images of the active area of the SMR with the HD CNTs grown, FIG. 14(a) the CNT immediately after growth, FIG. 14(b) Dried after DI water droplet has been added, FIG. 14(c) Dried after IPA has been added showing exposed resonator surface, and FIG. 14(d) Voids left after IPA densification in some devices that allow liquids to penetrate the forest to the resonator. There is significant exposure of the active area to liquids after IPA immersion shown in FIGS. 14(c) and 14(d). In comparison, DI water causes no damage and the CNT forest maintains its integrity as illustrated in FIG. 14(b).

Another possible limitation is that the high temperature required for growing CNTs via CVD may render them unsuitable for growth on plastic substrates. As an alternative, CNTs can be grown on an independent substrate and transferred into a liquid solution via an ultrasonic spinner. The solution containing debundled CNTs can then be deposited over the devices with a pipette, eliminating the need for high temperature processing. Although in this case dense and VA-CNTs would not be feasible and alternative methods such as indium assisted transfer VA-CNTs reported by Barako [Barako, 2014] would be necessary. Another substitute can be graphene layers, but the acoustic leakage could be significant where the graphene layer is thin.

Figure 16:
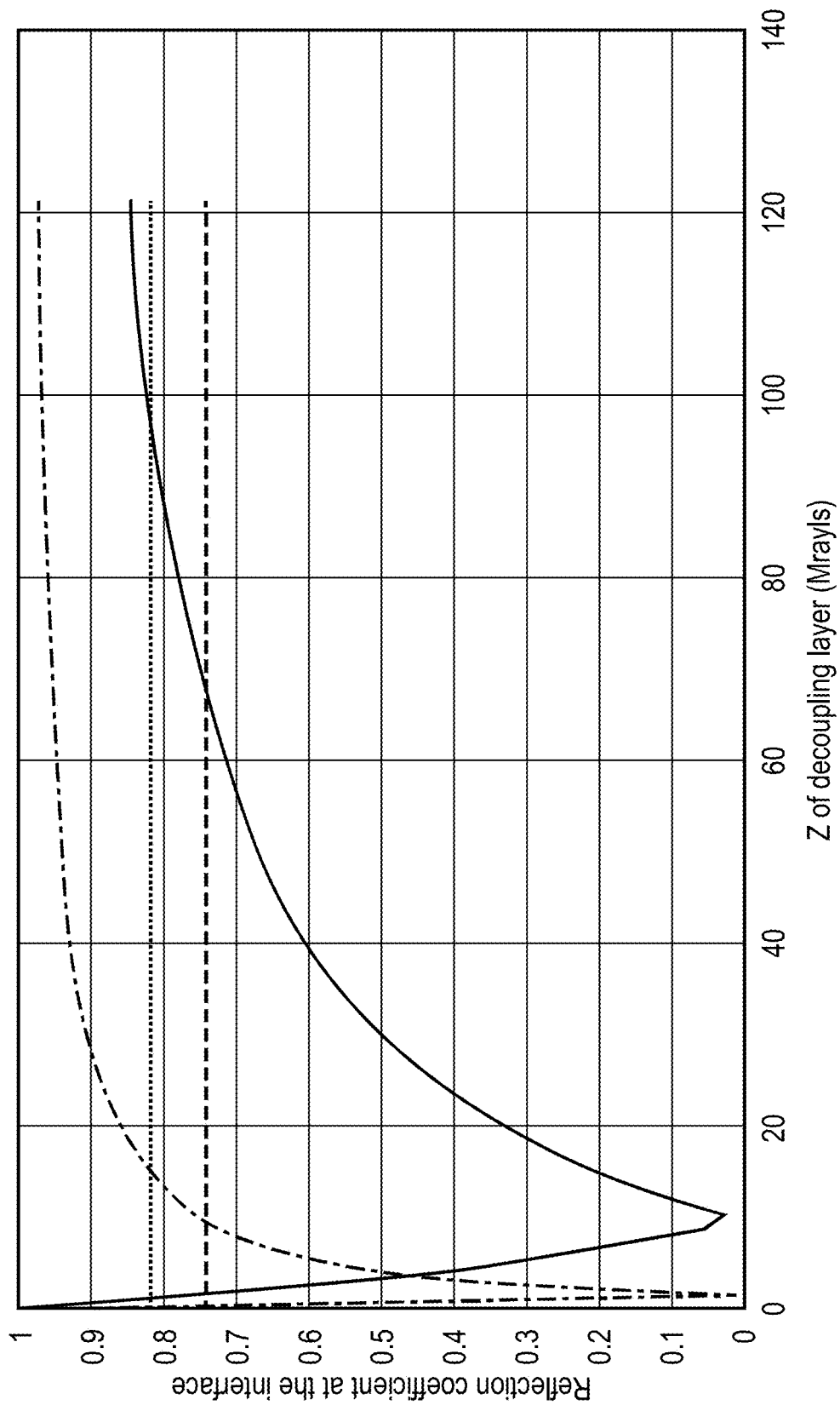
FIG. 16 shows a simulation of the effect of varying the acoustic impedance of the acoustic decoupling layer on the reflection coefficient provided by the interface between the top of the resonator structure and the acoustic decoupling layer and between the acoustic decoupling layer and the liquid.

It is possible to simulate the effect of varying the acoustic impedance of the acoustic decoupling layer on the reflection coefficient provided by the interface between the top of the resonator structure and the acoustic decoupling layer and between the acoustic decoupling layer and the liquid. This is shown in FIG. 16. For reference, the top layer of the resonator structure is assumed to be $SiO_2$ with an acoustic impedance $Z_0$ of 10 Mrayl. The liquid is assumed to be water with an acoustic impedance $Z_0$ of 1.48 Mrayl. The value Z of the acoustic impedance of the acoustic decoupling layer is allowed to vary between 0 and 120. Plotted as curved lines in FIG. 16 are the reflection coefficient at the interface between the top of the resonator structure and the acoustic decoupling layer (R top/decoupling, shown as an orange line) and the interface between the acoustic decoupling layer and the liquid (R decoupling/liquid, shown as a blue line). For reference, there is also plotted the reflection coefficient for an interface between the top of the resonator structure and the liquid (R top/liquid, shown as a red line). Also shown as a horizontal straight line is the reflection coefficient provided when $Z/Z_0=10$ and where $Z/Z_0=\frac{1}{10}$ (these lines coincide, shown as a grey line).

CONCLUSIONS

In this work, the growth of CNTs of different morphologies on the active area of SMRs is achieved by CVD at 600° C. varying the catalyst (Fe) thickness. The purpose of the CNT layer is to both isolate the resonator from liquids such as DI water to reduce acoustic damping by confining the acoustic wave in the SMR, in other words, to act as an acoustic isolation layer, or acoustic decoupling layer, and to permit mass attachment so as to give a measureable resonant frequency shift. AlN SMRs with both a TSM (1.1 GHz) and a TLM (1.9 GHz) resonance are fabricated to assess and compare the performance of CNT coated devices to non-coated SMRs in DI water. In this work, it is demonstrated that SMRs with highly packed CNT forests achieve the lowest TLM dissipation factors of 0.45% compared to 30% in uncoated SMRs. Additionally TSM resonances also suffer from a lower acoustic wave leakage (D decreases from 0.75% to 0.39%) into the deionised water droplet due to the presence of a highly packed CNT forest on the active area. Despite the presence of a tall CNT forest of up to about 15 μm heights, the SMRs are sensitive to mass loading caused by BSA solutions. The result in this work is significant in that the TLM can be made to operate in deionised water by using such an acoustic isolation layer. The present invention can therefore potentially lead to the successful scaling up of FBAR based biosensors for in-liquid applications.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

All references referred to above and/or listed below are hereby incorporated by reference.

NON-PATENT DOCUMENT REFERENCES

Lu, C.-S.; Lewis, O. Investigation of film-thickness determination by oscillating quartz resonators with large mass load. *Journal of Applied Physics* 1972, 43, 4385.

Benes, E. Improved quartz crystal microbalance technique. *Journal of Applied Physics* 1984, 56, 608.

Sauerbrey, G. Verwendung von Schwingquarzen zur Wägung dünner Schichten und zur Mikrowägung. *Zeitschrift für Physik* 1959, 155, 206.

Ruby, R. Review and Comparison of Bulk Acoustic Wave FBAR, SMR Technology. Ultrasonics Symposium, 2007. IEEE. 2007; pp 1029-1040.

Rosenbaum, J. F. *Bulk Acoustic Wave Theory and Devices*; Artech House: New York, 1945.

Aigner, R. MEMS in RF Filter Applications: Thin-film Bulk Acoustic Wave Technology. *Sensors Update* 2003, 12, 175-210.

Garcia-Gancedo, L.; Pedrós, J.; Iborra, E.; Clement, M.; Zhao, X. B.; Olivares, J.; Capilla, J.; Luo, J. K.; Lu, J. R.; Milne, W. I. et al. Direct comparison of the gravimetric responsivities of ZnO-based FBARs and SMRs. *Sensors and Actuators B: Chemical* 2013, 183, 136-143.

Auld, B. A. *Acoustic Fields and Waves in Solids*, Vol. 2; Krieger Pub Co, 1990.

Wingqvist, G. AlN-based sputter-deposited shear mode thin film bulk acoustic resonator (FBAR) for biosensor applications—A review. *Surface and Coatings Technology* 2010, 205, 1279.

Weber, J.; Albers, W. M.; Tuppurainen, J.; Link, M.; Gabl, R.; Wersing, W.; Schreiter, M. Shear mode FBARs as highly sensitive liquid biosensors. *Sensors and Actuators A: Physical* 2006, 128, 84-88.

Gabl, R.; Feucht, H. D.; Zeininger, H.; Eckstein, G.; Schreiter, M.; Primig, R.; Pitzer, D.; Wersing, W. First results on label-free detection of DNA and protein molecules using a novel integrated sensor technology based on gravimetric detection principles. *Biosensors and Bioelectronics* 2004, 19, 615.

Nirschl, M.; Blüher, A.; Erler, C.; Katzschner, B.; Vikholm-Lundin, I.; Auer, S.; Vörös, J.; Pompe, W.; Schreiter, M.; Mertig, M. Film bulk acoustic resonators for DNA and protein detection and investigation of in vitro bacterial S-layer formation. *Sensors and Actuators A: Physical* 2009, 156, 180-184.

Chen, D.; Wang, J.; Xu, Y.; Li, D.; Zhang, L.; Li, Z. Highly sensitive detection of organophosphorus pesticides by acetylcholinesterase-coated thin film bulk acoustic resonator mass-loading sensor. *Biosensors and Bioelectronics* 2013, 41, 163-167.

Wingqvist, G.; Bjurstrbm, J.; Liljeholm, L.; Yantchev, V.; Katardjiev, I. Shear mode AlN thin film electro-acoustic resonant sensor operation in viscous media. *Sensors and Actuators B: Chemical* 2007, 123, 466-473.

DeMiguel-Ramos, M.; Mirea, T.; Clement, M.; Olivares, J.; Sangrador, J.; Iborra, E. Optimized tilted c-axis AlN films for improved operation of shear mode resonators. *Thin Solid Films* 2015, 590, 219-223.

DeMiguel-Ramos, M.; Diaz-Durán, B.; Escolano, J.-M.; Barba, M.; Mirea, T.; Olivares, J.; Clement, M.; Iborra, E. Gravimetric biosensor based on a 1.3 GHz AlN shear-mode solidly mounted resonator. *Sensors and Actuators B: Chemical* 2017, 239, 1282-1288.

Clement, M.; Iborra, E.; Olivares, J.; DeMiguel-Ramos, M.; Mirea, T.; Sangrador, J. On the effectiveness of lateral excitation of shear modes in AlN layered resonators. *Ultrasonics* 2014, 54, 1504-1508.

Rughoobur, G.; DeMiguel-Ramos, M.; Mirea, T.; Clement, M.; Olivares, J.; Diaz-Durán, B.; Sangrador, J.; Milne, W. I.; Iborra, E.; Flewitt, A. J. Room temperature sputtering of inclined c-axis ZnO for shear mode solidly mounted resonators. *Applied Physics Letters* 2016, 108, 034103.

Qin, L.; Chen, Q.; Cheng, H.; Chen, Q.; Li, J.-F.; Wang, Q.-M. Viscosity sensor using ZnO and AlN thin film bulk acoustic resonators with tilted polar c-axis orientations. *Journal of Applied Physics* 2011, 110, 094511.

Yanagitani, T.; Kiuchi, M.; Matsukawa, M.; Watanabe, Y. Characteristics of Pure-shear Mode BAW Resonators Consisting of (112-0) Textured ZnO Films. *Ultrasonics, Ferroelectrics, and Frequency Control, IEEE Transactions on* 2007, 54, 1680-1686.

Xu, W.; Zhang, X.; Yu, H.; Abbaspour-Tamijani, A.; Chae, J. In-Liquid Quality Factor Improvement for Film Bulk Acoustic Resonators by Integration of Microfluidic Channels. *Electron Device Letters, IEEE* 2009, 30, 647-649.

Xu, W.; Zhang, X.; Choi, S.; Chae, J. A High-Quality-Factor Film Bulk Acoustic Resonator in Liquid for Biosensing Applications. *Microelectromechanical Systems, Journal of* 2011, 20, 213-220.

Zhang, H.; Kim, E. S. Micromachined Acoustic Resonant Mass Sensor. *Microelectromechanical Systems, Journal of* 2005, 14, 699-706.

Pottigari, S. S.; Kwon, J. W. Vacuum-gapped film bulk acoustic resonator for low-loss mass sensing in liquid. Proc. Actuators and Microsystems Conf. TRANSDUCERS 2009-2009 Int. Solid-State Sensors. 2009; pp 156-159.

Treacy, M. M. J.; Ebbesen, T. W.; Gibson, J. M. Exceptionally high Young's modulus observed for individual carbon nanotubes. *Nature* 1996, 381, 678-680.

Iborra, E.; Sangrador, J.; Clement, M.; Mirea, T.; DeMiguel-Ramos, M.; Olivares, J.; Capilla, J.; Garc'ia-Gancedo, L.; Esconjauregui, S.; Flewitt, A. J. et al. Acoustic properties of carbon nanotube electrodes in BAW resonators. European Frequency and Time Forum International Frequency Control Symposium (EFTF/IFC), 2013 Joint. 2013; pp 984-987.

Wang, S.; Humphreys, E. S.; Chung, S.-Y.; Delduco, D. F.; Lustig, S. R.; Wang, H.; Parker, K. N.; Rizzo, N. W.; Subramoney, S.; Chiang, Y.-M. et al. Peptides with selective affinity for carbon nanotubes. *Nature Materials* 2003, 2, 196-200.

Garcia-Gancedo, L.; Al-Naimi, F.; Flewitt, A. J.; Milne, W. I.; Ashley, G. M.; Luo, J. K.; Zhao, X.; Lu, J. R. ZnO-Based FBAR resonators with carbon nanotube electrodes. *IEEE Transactions on Ultrasonics, Ferroelectrics and Frequency Control* 2011, 58, 2438-2445.

Garcia-Gancedo, L.; Zhu, Z.; Iborra, E.; Clement, M.; Olivares, J.; Flewitt, A. J.; Milne, W. I.; Ashley, G. M.; Luo, J. K.; Zhao, X. B. et al. AlN-based BAW resonators with CNT electrodes for gravimetric biosensing. *Sensors and Actuators B: Chemical* 2011, 160, 1386-1393.

Mann, M.; Zhang, Y.; Teo, K.; Wells, T.; El Gomati, M.; Milne, W. Controlling the growth of carbon nanotubes for electronic devices. *Microelectronic Engineering* 2010, 87, 1491-1493.

Zhong, G.; Warner, J. H.; Fouquet, M.; Robertson, A. W.; Chen, B.; Robertson, J. Growth of Ultrahigh Density Single-Walled Carbon Nanotube Forests by Improved Catalyst Design. *ACS Nano* 2012, 6, 2893-2903.

Futaba, D. N.; Hata, K.; Yamada, T.; Hiraoka, T.; Hayamizu, Y.; Kakudate, Y.; Tanaike, O.; Hatori, H.; Yumura, M.; Iijima, S. Shape-engineerable and highly densely packed single-walled carbon nanotubes and their application as super-capacitor electrodes. *Nature materials* 2006, 5, 987-994.

Sugime, H.; Esconjauregui, S.; D'Arsié, L.; Yang, J.; Makaryan, T.; Robertson, J. Growth Kinetics and Growth Mechanism of Ultrahigh Mass Density Carbon Nanotube Forests on Conductive Ti/Cu Supports. *ACS Applied Materials & Interfaces* 2014, 6, 1544-15447.

Joddar, B.; Garcia, E.; Casas, A.; Stewart, C. M. Development of functionalized multi-walled carbon-nanotube-based alginate hydrogels for enabling biomimetic technologies. *Scientific Reports* 2016, 6, 32456.

Garcia-Gancedo, L.; Iborra, E.; Clement, M.; Olivares, J.; Zhu, Z.; Flewitt, A. J.; Milne, W. I.; Ashley, G. M.; Luo, J. K.; Zhao, X. B. et al. Solidly mounted resonators with carbon nanotube electrodes for biosensing applications. Frequency Control and the European Frequency and Time Forum (FCS), 2011 Joint Conference of the IEEE International. 2011; pp 1-5.

Esconjauregui, S.; Makaryan, T.; Mirea, T.; DeMiguel-Ramos, M.; Olivares, J.; Guo, Y.; Sug-ime, H.; D'Arsie, L.; Yang, J.; Bhardwaj, S. et al. Carbon nanotube forests as top electrode in electroacoustic resonators. *Applied Physics Letters* 2015, 107, 133106.

Robertson, J.; Hofmann, S.; Cantoro, M.; Parvez, A.; Ducati, C.; Zhong, G.; Sharma, R.; Mattevi, C. Controlling the Catalyst During Carbon Nanotube Growth. *Journal of Nanoscience and Nanotechnology* 2008, 8, 6105-6111.

DeMiguel-Ramos, M.; Clement, M.; Olivares, J.; Capilla, J.; Sangrador, J.; Iborra, E. Induced surface roughness to promote the growth of tilted-AlN films for shear mode resonators. European Frequency and Time Forum International Frequency Control Symposium (EFTF/IFC), 2013 Joint. 2013.

Yokoyama, T.; Iwazaki, Y.; Nishihara, T.; Ueda, M. Analysis on electromechanical coupling coefficients in AlN-based bulk acoustic wave resonators based on first-principle calculations. 2012 IEEE International Ultrasonics Symposium. 2012.

Barako, M. T.; Gao, Y.; Won, Y.; Marconnet, A. M.; Asheghi, M.; Goodson, K. E. Reactive Metal Bonding of Carbon Nanotube Arrays for Thermal Interface Applications. *IEEE Trans-actions on Components, Packaging and Manufacturing Technology* 2014, 4, 1906-1913.

Mirea, T.; Olivares, J.; Clement, M.; DeMiguel-Ramos, M.; de Frutos, J.; Sangrador, J.; Iborra, E. Carbon nanotube growth on piezoelectric AlN films: influence of catalyst under-layers. *RSC Adv.* 2015, 5, 80682-80687.

Olivares, J.; Mirea, T.; Diaz-Durán, B.; Clement, M.; DeMiguel-Ramos, M.; Sangrador, J.; de Frutos, J.; Iborra, E. Growth of carbon nanotube forests on metallic thin films. *Carbon* 2015, 90, 9-15.

Hofmann, S.; Blume, R.; Wirth, C. T.; Cantoro, M.; Sharma, R.; Ducati, C.; Hävecker, M.; Zafeiratos, S.; Schnoerch, P.; Oestereich, A. et al. State of transition metal catalysts during carbon nanotube growth. *The Journal of Physical Chemistry C* 2009, 113, 1648-1656.

Lakin, K. M. Acoustic bulk wave composite resonators. *Applied Physics Letters* 1981, 38, 125.

Flewitt, A. J.; Luo, J. K.; Fu, Y. Q.; Garcia-Gancedo, L; Du, X. Y.; Lu, J. R.; Zhao, X. B.; Iborra, E; Ramos, M; Milne, W. I. ZnO based SAW and FBAR devices for bio-sensing applications. J. Non-Newtonian *Fluid Mech.* 2015, 222, 209-216.

DeMiguel-Ramos, M. et al. Assessment of the Shear Acoustic Velocities in the Different Materials Composing a High Frequency Solidly Mounted Resonator. *Ultrasonics*, 2015, 62 p195-199.

The invention claimed is:

1. A method of sensing a target analyte in a liquid sample including the steps:
    providing a bulk acoustic wave resonator device;
    placing a liquid sample on the bulk acoustic wave resonator device;
    operating the bulk acoustic wave resonator device to generate bulk acoustic waves; and
    measuring a shift in a fundamental resonant frequency of the bulk acoustic wave resonator device,
    wherein the bulk acoustic wave resonator device comprises a resonator structure and an acoustic decoupling layer, the resonator structure comprising:
        a piezoelectric material layer;
        electrodes arranged to apply a driving signal to the piezoelectric material layer to generate bulk acoustic waves; and
        a resonator structure surface,
    wherein:
        the resonator structure has a resonator structure acoustic impedance and the liquid sample has a liquid sample acoustic impedance;
        the acoustic decoupling layer is formed over the resonator structure surface; and
        the acoustic decoupling layer has an acoustic decoupling layer acoustic impedance, the acoustic decoupling layer acoustic impedance being:
            up to ⅕ times or not less than 5 times the resonator structure acoustic impedance, and
            up to ⅕ times or not less than 5 times the liquid sample acoustic impedance.

2. The method according to claim 1 wherein the thickness of the acoustic decoupling layer is between ⅛λ and 50λ where λ is the wavelength in the decoupling layer at the fundamental resonant frequency of the resonator.

3. The method according to claim 1 wherein the acoustic decoupling layer comprises carbon nanotubes.

4. The method according to claim 3 wherein the density of carbon nanotubes in the acoustic decoupling layer is at least $0.3 \times 10^{10}$ cm$^{-2}$.

5. The method according to claim 3 wherein the density of carbon nanotubes in the acoustic decoupling layer is at least $1 \times 10^{10}$ cm$^{-2}$.

6. The method according to claim 1 wherein the liquid sample comprises an aqueous liquid.

7. The method according to claim 1 wherein the liquid sample acoustic impedance is in the range 1.48 MRayl to 2 MRayl.

8. The method according to claim 1 wherein the fundamental resonant frequency of the bulk acoustic wave resonator device is in the range 1-5 GHz.

9. The method according to claim 1 wherein the bulk acoustic wave resonator device is an SMR type device.

10. The method according to claim 1 wherein the acoustic decoupling layer is formed on an upper electrode of the electrodes of the resonator structure.

11. The method according to claim 1 wherein the acoustic decoupling layer includes binding sites specific for the analyte in the liquid sample.

12. The method according to claim 1 wherein the liquid sample partially penetrates the acoustic decoupling layer.

13. The method according to claim 1 wherein the bulk acoustic wave resonator device is operated in longitudinal mode.

\* \* \* \* \*